United States Patent
Proctor, Jr. et al.

(10) Patent No.: US 8,787,248 B2
(45) Date of Patent: *Jul. 22, 2014

(54) METHOD IN A WIRELESS REPEATER EMPLOYING AN ANTENNA ARRAY INCLUDING VERTICAL AND HORIZONTAL FEEDS FOR INTERFERENCE REDUCTION

(75) Inventors: James Arthur Proctor, Jr., Melbourne Beach, FL (US); Kenneth M. Gainey, San Diego, CA (US); Steven J. Howard, Ashland, MA (US); Hakan Inanoglu, Acton, MA (US)

(73) Assignee: QUALCOMM Incorporated, San Diego, CA (US)

( * ) Notice: Subject to any disclaimer, the term of this patent is extended or adjusted under 35 U.S.C. 154(b) by 331 days.

This patent is subject to a terminal disclaimer.

(21) Appl. No.: 13/155,292

(22) Filed: Jun. 7, 2011

(65) Prior Publication Data
US 2012/0015603 A1   Jan. 19, 2012

Related U.S. Application Data

(63) Continuation-in-part of application No. 12/836,493, filed on Jul. 14, 2010, now Pat. No. 8,477,665.

(51) Int. Cl.
*H04B 7/204* (2006.01)

(52) U.S. Cl.
USPC .......... 370/325; 370/319; 370/321; 370/323; 455/9; 455/11.1; 455/13.3

(58) Field of Classification Search
None
See application file for complete search history.

(56) References Cited

U.S. PATENT DOCUMENTS

| | | | |
|---|---|---|---|
| 7,386,006 B2 | 6/2008 | Rimi et al. | |
| 7,907,891 B2 | 3/2011 | Proctor, Jr. et al. | |
| 2003/0039228 A1* | 2/2003 | Shiu et al. | 370/331 |
| 2003/0124976 A1* | 7/2003 | Tamaki et al. | 455/15 |
| 2003/0220755 A1 | 11/2003 | Darbel et al. | |
| 2004/0001554 A1* | 1/2004 | Sun et al. | 375/260 |
| 2004/0184428 A1 | 9/2004 | Im | |
| 2007/0281604 A1 | 12/2007 | Morris et al. | |
| 2008/0089267 A1* | 4/2008 | Zhu et al. | 370/315 |
| 2008/0225929 A1 | 9/2008 | Proctor et al. | |
| 2008/0225931 A1* | 9/2008 | Proctor et al. | 375/214 |
| 2012/0015608 A1 | 1/2012 | Proctor, Jr. et al. | |

OTHER PUBLICATIONS

International Search Report and Written Opinion—PCT/US2011/044070—ISA/EPO—Nov. 14, 2011.

* cited by examiner

*Primary Examiner* — Anez Ebrahim
(74) *Attorney, Agent, or Firm* — Linda G. Gunderson; Michael Johnson

(57) ABSTRACT

An echo cancellation wireless repeater with first and second antenna arrays having vertical and horizontal feed antenna elements selects a combination of antenna elements for reception and transmission to reduce interference and improve the quality of signal reception. In one embodiment, the antenna elements are switchably connected to transceiver circuits and a combination of antenna elements is selected based on the best desired performance result. In another embodiment, the antenna elements are each connected to its own transceiver circuit and the echo cancellation repeater performs beamforming in baseband to select a combination of antenna elements.

45 Claims, 20 Drawing Sheets

METHOD IN A WIRELESS REPEATER EMPLOYING AN ANTENNA ARRAY INCLUDING VERTICAL AND HORIZONTAL FEEDS FOR INTERFERENCE REDUCTION

CROSS-REFERENCE TO RELATED APPLICATION

This application is a continuation-in-part of application Ser. No. 12/836,493, filed Jul. 14, 2010, entitled "Method In a Wireless Repeater Employing an Antenna Array for Interference Reduction," having at least one common inventor, which patent application is incorporated herein by reference in its entirety.

BACKGROUND

1. Field

This disclosure generally relates to repeaters in wireless communication systems.

2. Background

Wireless communication systems and techniques have become an important part of the way we communicate. However, providing coverage can be a significant challenge to wireless service providers. One way to extend coverage is to deploy repeaters. In general, a repeater is a device that receives a signal, amplifies the signal, and transmits the amplified signal. A typical repeater configuration includes a donor antenna as an example network interface to network infrastructure such as a base station. The repeater also includes a server antenna (also referred to as a "coverage antenna") as a mobile interface to one or more mobile devices. In operation, the donor antenna is in communication with the base station, while the server antenna is in communication with one or more mobile devices. Signals from the base station are amplified using forward link circuitry, while signals from the mobile devices are amplified using reverse link circuitry. Many configurations may be used for the forward link circuitry and the reverse link circuitry.

There are many types of repeaters. In some repeaters, both the network and mobile interfaces are wireless; while in others, a wired network interface is used. Some repeaters receive signals with a first carrier frequency and transmit amplified signals with a second different carrier frequency, while others receive and transmit signals using the same carrier frequency. For "same frequency" repeaters, one particular challenge is managing the feedback that occurs since some of the transmitted signal can leak back to the receive circuitry and be amplified and transmitted again. Existing repeaters manage feedback using a number of techniques, including physical isolation between the donor and server antennae and echo cancellation techniques.

Wireless service providers continue to face issues such as inadequate indoor 3G voice and data coverage, especially in homes and SOHOs (Small Offices, Home Offices). Repeaters have a long history in wireless networks, with mixed results. Very large infrastructure related repeaters have been successfully deployed to fill coverage holes and reduce total base station sites during initial deployments. However, personal repeaters (indoor self installation type) have not been successfully adopted broadly in the market due to a number of factors. One issue which impacts the deployments of personal repeaters in congested areas is "pilot pollution", or other interfering signals. Pilot pollution is the situation when too many base stations are received at the mobile or the repeater's receiver causing a reduction in signal quality. While many 3G systems use soft hand off, there are limits to when the soft hand off approach provides benefit, and when too many signals are simply interference. Further, for data optimized systems, such as 1XEV-DO, and 4G systems, such as LTE, soft handoff is often not used, opting rather for a fast selection diversity between base stations.

The interfering condition of too many signals at a receiver is especially problematic for "same frequency" repeaters because boosting the signal may simply amplify and broadcast a poor signal-to-noise ratio (SNR) signal which may not be beneficial in some cases. Generally a repeater cannot improve the quality of the signal it receives and in the condition of strong signal level, but significant interference, a repeater may not provide significant benefit because the repeater would only cause an increase in the interfering noise of the system.

SUMMARY

Systems, apparatuses, and methods disclosed herein allow for enhanced repeater capability. In one embodiment, a method to reduce interference in an echo cancellation repeater for a wireless communication network where the repeater employs a first antenna array and a second antenna array and each antenna array includes a first set of antenna elements for vertical feed mode and a second set of antenna elements for horizontal feed mode includes: (a) selecting a combination of antenna elements from the first and second antenna arrays; (b) receiving incoming signals on receiver circuits associated with the selected antenna elements; (c) generating correlation energy measurements indicative of the correlation of the receive signals and one or more reference signals; (d) selecting a desired receive signal being a receive signal with the largest correlated energy level, excluding receive signals that are feedback signals of the repeater; (e) calculating antenna weights for the selected antenna elements using one of an error minimizing algorithm and an adaptive metric optimization algorithm; (f) determining a performance result associated with the selected combination of antenna elements; (g) storing calculated antenna weights and the performance result associated with the selected combination of antenna elements; (h) repeating steps (a) to (g) for one or more combinations of antenna elements from the first and second antenna arrays; and (i) selecting a combination of antenna elements from the first and second antenna arrays based on the stored performance results. The combination of antenna elements may be selected to optimize a desired performance result.

According to another aspect of the present invention, a repeater for a wireless communication network where the repeater employs echo cancellation and employs a first antenna array and a second antenna array and each antenna array includes a first set of antenna elements for vertical feed mode and a second set of antenna elements for horizontal feed mode includes: one or more switches where each switch is coupled to two or more antenna elements in each of the first and second antenna array and the one or more switches is configured to select one of the two or more antenna elements coupled thereto; receiver circuits coupled to the one or more switches to receive incoming signals associated with the selected antenna elements; an antenna element selection module and an antenna weight computation module configured to select one or more combinations of antenna elements, to perform calculations of antenna weights for each selected combination of antenna elements, to determine a performance result associated with each selected combination of antenna elements, and to select a combination of antenna elements from the first and second antenna arrays based on the performance results; and an antenna weight application module configured to apply the calculated antenna weight to condition the receive signals.

According to yet another aspect of the present invention, a method to reduce interference in an echo cancellation repeater for a wireless communication network where the repeater employs a first antenna array and a second antenna array and each antenna array includes a first set of antenna elements for vertical feed mode and a second set of antenna elements for horizontal feed mode includes: (a) receiving incoming signals on receiver circuits associated with the antenna elements; (b) generating correlation energy measurements indicative of the correlation of the receive signals and one or more reference signals; (c) selecting a desired receive signal being a receive signal with the largest correlated energy level, excluding receive signals that are feedback signals of the repeater; (d) calculating antenna weights for the antenna elements using one of an error minimizing algorithm and an adaptive metric optimization algorithm; (e) determining a performance result associated with the antenna elements; (f) performing beamforming in baseband to adjust the calculated antenna weights, the adjusted antenna weights selecting a combination of antenna elements from the first and second antenna arrays for receiving and transmitting signals.

According to yet another aspect of the present invention, a repeater for a wireless communication network where the repeater employs echo cancellation and employs a first antenna array and a second antenna array and each antenna array includes a first set of antenna elements for vertical feed mode and a second set of antenna elements for horizontal feed mode includes: receiver circuits coupled to receive incoming signals associated with the antenna elements; an antenna element selection module and an antenna weight computation module configured to perform calculations of antenna weights for the antenna elements, to determine a performance result associated with the antenna elements, and to select a combination of antenna elements from the first and second antenna arrays based on the performance results; and an antenna weight application module configured to apply the calculated antenna weight to condition the receive signals.

DETAILED DESCRIPTION

The nature, objectives, and advantages of the disclosed method and apparatus will become more apparent to those skilled in the art after considering the following detailed description in connection with the accompanying drawings.

Repeater with Antenna Array

A repeater incorporating an antenna array and an echo cancellation module and utilizing a composite metric for optimizing the weight settings for the antenna array for enhancing echo cancellation is described in copending and commonly assigned U.S. Patent Application Publication No. 2008/0225931, entitled "Use of Adaptive Antenna Array in conjunction with an ON-Channel Repeater to improve signal quality," by J. Proctor et al, filed Mar. 3, 2008 and published Sep. 18, 2008, which patent application is incorporated herein by reference in its entirety. The composite metric is derived from other metrics available in the repeater system and can include Ec/Io, SNR, RSSI, Correlated Power and specific isolation related metrics associated with the repeater operation. For instance, by combining the residual leakage metric with other metrics, cancellation and array weights can be jointly optimized.

Figure 1:
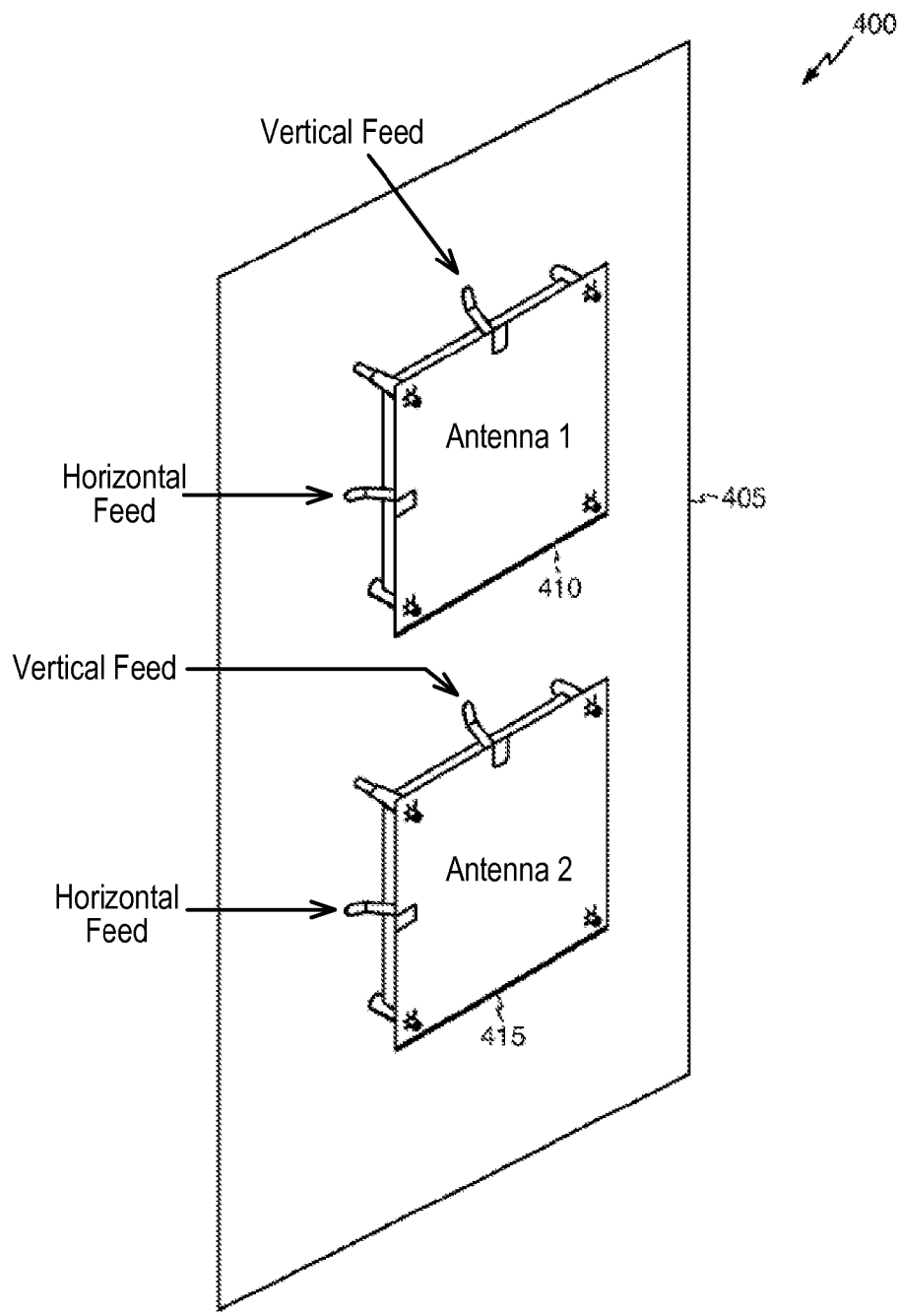
FIG. 1 is a block diagram of exemplary repeater components in accordance with the systems and methods described herein.
Figure 4:
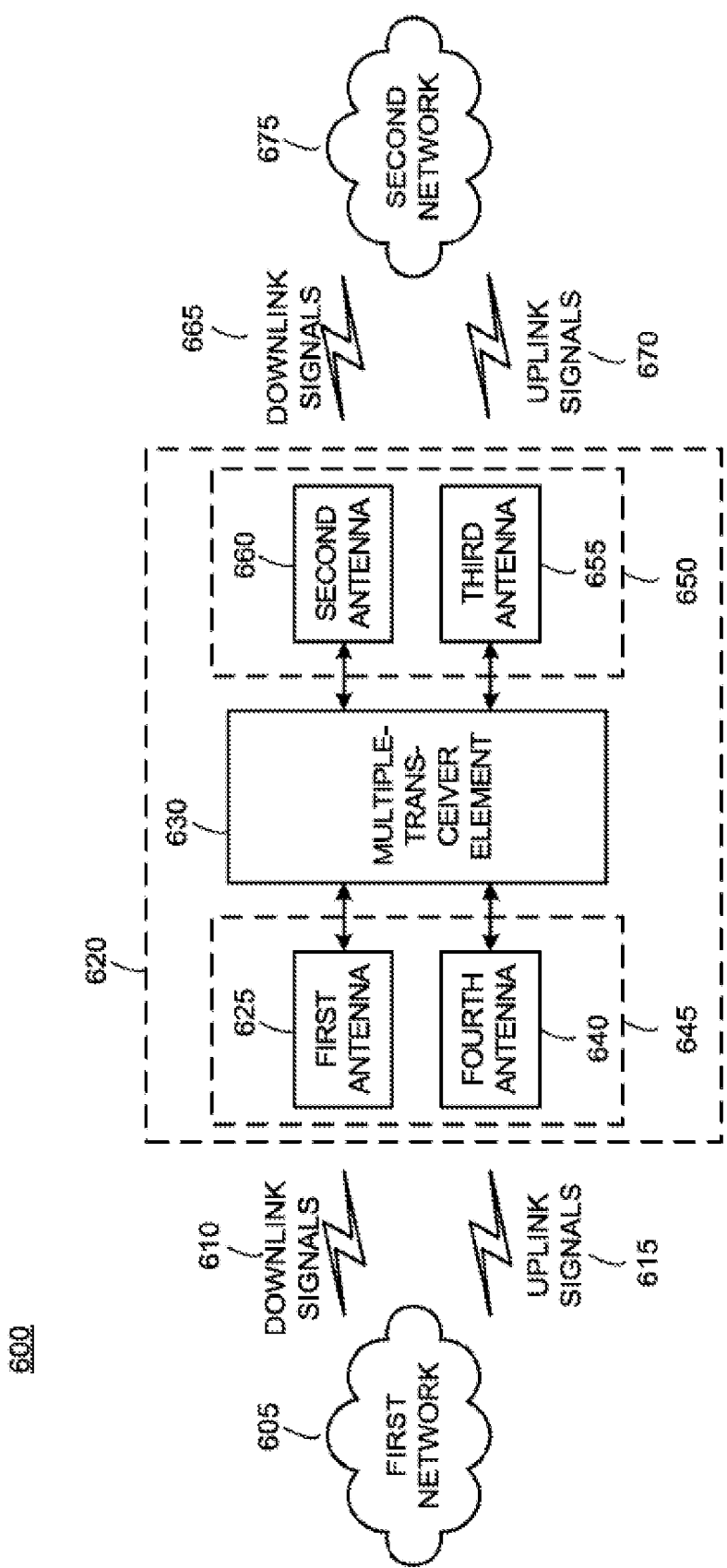
FIG. 4 illustrates a repeater environment in which a repeater with an antenna array is deployed according to embodiments of the present invention.

FIG. 1 duplicates FIG. 4 of the '931 patent application and is a block diagram of exemplary repeater components in accordance with the systems and methods described herein. More specifically, FIG. 1 illustrates one side of an antenna configuration for use in providing selected isolation for an exemplary repeater. Antenna configuration 400 comprises PCB board 405 having one or more patch antennas 410 and 415 mounted thereto. Note that typically there would be a like number of antenna patches on the opposite side of PCB and typically orientated in an opposite or advantageous polarization when compared to the polarization of antennas 410 and 415, such that a sufficient or even maximum amount of isolation is achieved between the antennas on opposite sides of the PCB. In an illustrative implementation, PCB board 405 can comprise one or more patch antennas 410 and 415 in various configurations and have more than one pair of patch antennas as well as an uneven number of respective patch antennas that make up a superset thereof. Antenna configuration 400 can, with the deployment of patch antennas 410 and 415 along with a like number of antenna on the opposite side of the PCB, provide selected isolation between a transmit and receive channel (e.g., transmit channels operatively coupled to one or more patch antennae and receive channels operatively coupled to one or more patch antennae) to cooperate with isolation and amplification provided by an exemplary cooperating feedback cancellation loop (e.g., feedback cancellation loop operatively coupled to an antenna array). The configuration of FIG. 1 shows one example of antenna arrays that can be used in embodiments described herein.

Figure 2:
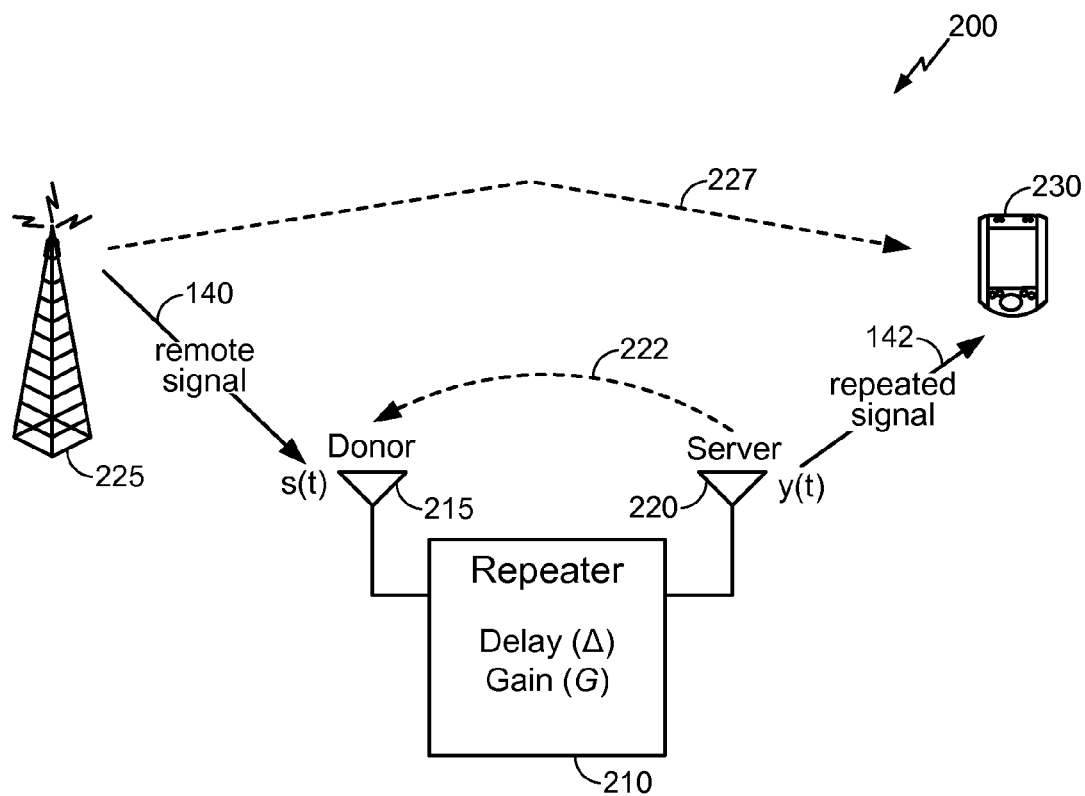
FIG. 2 shows a diagram of an operating environment for a repeater according to embodiments of the present invention.

FIG. 2 shows a diagram of an operating environment 200 for a repeater 210 according to embodiments of the present invention. The example of FIG. 2 illustrates forward link transmissions; i.e., a remote signal 140 from a base station 225 is intended for a mobile device 230. A repeater, such as repeater 210, may be used in environment 200 if an unrepeated signal along the path 227 between base station 225 and mobile device 230 would not provide sufficient signal for effective voice and/or data communications received at mobile device 230. Repeater 210 with a gain G and a delay Δ is configured to repeat a signal received from base station 225 on a donor antenna 215 to mobile device 230 using a server antenna 220. The donor antenna is also referred to as "the receiving antenna" for the example of a forward link transmission while the server antenna is also referred to as "the transmitting antenna" for forward link transmissions. Repeater 210 includes forward link circuitry for amplifying and transmitting signals received from the base station 225 to mobile device 230 through donor antenna 215 and server antenna 220. Repeater 210 may also include reverse link circuitry for amplifying and transmitting signals from mobile device 230 back to base station 225. At repeater 210, the remote signal s(t) is received as an input signal and the remote signal s(t) is repeated as a repeated or amplified signal y(t) where $y(t)=\sqrt{G}s(t-\Delta)$.

Ideally, the gain G of a repeater would be made as large as possible. In practice, the gain of repeater 210 is limited by the isolation between donor antenna 215 and server antenna 220. If the gain is too large, the repeater can become unstable due to signal leakage. Signal leakage refers to the phenomenon where a portion of the signal that is transmitted from one antenna (in FIG. 2, server antenna 220) is received by the other antenna (in FIG. 2, donor antenna 215), as shown by the feedback path 222 in FIG. 2. Without interference cancellation or other techniques, the repeater would amplify this feedback signal, also referred to as the "leakage signal," as part of its normal operation, and the amplified feedback signal would again be transmitted by server antenna 220. The repeated transmission of the amplified feedback signal due to signal leakage and high repeater gain can lead to repeater instability. In general, repeaters may employ interference cancellation or echo cancellation to reduce or eliminate the amount of leakage signal between the repeater's antennas, thereby improving the antenna isolation. Herein, "interference cancellation" or "echo cancellation" refers to cancellation of an estimated leakage signal, which provides for partial or complete cancellation of the actual leakage signal.

Figure 3:
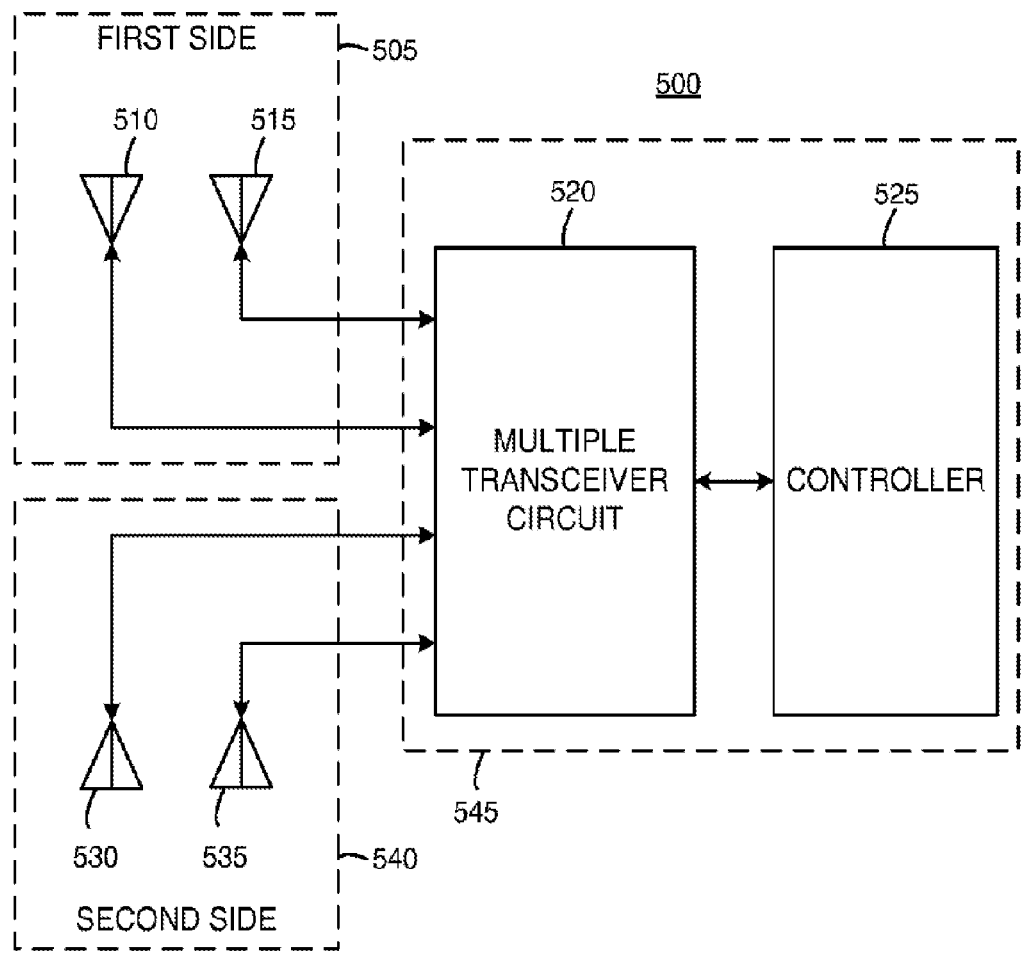
FIG. 3 illustrates an exemplary repeater operative to perform signal conditioning and amplification using one or more antenna arrays according to embodiments of the present invention.

FIG. 3 illustrates an exemplary repeater 500 operative to perform signal conditioning and amplification using one or more antenna arrays according to embodiments of the present invention. Repeater 500 includes a first antenna array 505 having antenna elements 510 and 515, a second antenna array having antenna elements 530 and 535, a processing circuitry 545 including a multiple transceiver circuit 520 and a controller 525. The antenna arrays 505 and 540 can cooperate with multiple transceiver circuit 520 which cooperates with controller 525 as part of operations of repeater 500. Signals can be received by antenna arrays 505 and 540 and passed to processing circuitry 545 for signal conditioning and processing and then passed back to antenna arrays 505 and 540 for communication with one or more cooperating components (e.g., base station of a CDMA wireless communications network).

In other embodiments, antenna arrays 505 and 540 can include additional antenna elements as desired. Further, the number and configuration of the antenna arrays described herein are merely illustrative as the herein described repeater systems and methods contemplate use of varying number of antenna arrays having varying configurations and comprising varying number of antenna elements.

FIG. 4 illustrates a repeater environment in which a repeater with an antenna array is deployed according to embodiments of the present invention. A repeater 620 in repeater environment 600 includes an antenna array 645 having a first antenna 625 and a fourth antenna 640, a multiple transceiver element 630, and an antenna array 650 comprising a second antenna element 660 and a third antenna element 655. Operatively, downlink signals 610 originating from first network 605 can be processed by repeater 620 to generate repeated downlink signals 665 for communication to second network 675, and uplink signals originating from second network 675 can be processed by repeater 620 to generate repeated uplink signals 615 for communication to first network 605. Configuration and orientation of the antenna arrays 645 and 650 promote selected isolation of the unconditioned uplink and downlink signals and promote desired amplification and gain of such signals.

In other embodiments, repeater 620 can include additional antenna elements. Further, it is appreciated that the number and configuration of the antenna arrays described herein are merely illustrative as the repeater system and method of the present invention contemplate use of varying number of antenna arrays having varying configurations and comprising varying number of antenna elements.

Array Weight Determination for Interference Reduction

Systems and techniques herein provide for repeaters with an antenna array employing spatial selectivity to improve the quality of the signal the repeater receives. In general, a conventional repeater cannot improve the quality of the signal it receives, only amplifying what is receives. In embodiments of the present invention, the repeaters implementing the systems and techniques of the present invention use adaptive metric optimization algorithms or error minimizing algorithms to determine the array weights so as to steer reception of the antenna array, thereby improving the quality of the receive signal, improving reception and removing interferences.

In some embodiments, systems and techniques herein provide for a wireless repeater employing an antenna array whereby a desired receive signal is selected through correlation with a reference signal. In CDMA based communication systems, the reference signal is the known pilot signal or the known pilot code. More specifically, the pilot code can be the pilot channel or pilot code phase transmitted by the base stations in a CDMA communication system, or the pilot code can be the scrambling code in a WCDMA communication system. In non-CDMA based communication system, the reference signal can be some or all of the pilot tones in an OFDM symbol or an OFDM preamble.

In some embodiments, the array weights for the antenna array are determined adaptively by maximizing the signal-to-noise ratio (SNR) of the desired receive signal. More specifically, in one embodiment, the antenna weights are adapted using a metric and an adaptive metric optimization algorithm. That is, a metric is provided to estimate the SNR of the desired receive signal and the antenna weights are recursively computed to optimize the predetermined metric. Examples of adaptive metric optimization algorithms include steepest decent based algorithms. In one embodiment, the metric used is the ratio of the correlated power of the desired receive signal to the sum of the correlated power of all or some of the other receive signals. Furthermore, in one embodiment, a steepest descent algorithm is used to recursively determine the antenna weights while optimizing the aforementioned metric.

In other embodiments, the antenna weights are computed using closed form calculations using an error minimizing algorithm, such as using a minimum mean square error (MMSE) algorithm or a least-mean square (LMS) algorithm. In one embodiment, the antenna weights are determined in closed form to minimize the mean square error between the receive signal and the reference signal.

Figure 5:
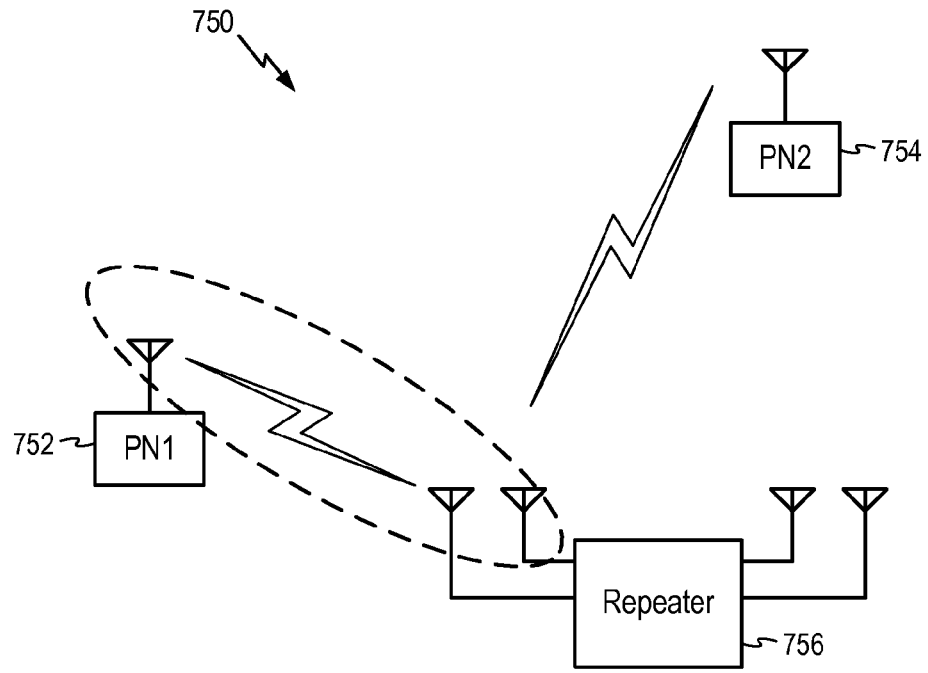
FIG. 5 illustrates an operating environment in which a wireless repeater with an antenna array is deployed.

FIG. 5 illustrates an operating environment 750 in which a wireless repeater with an antenna array is deployed. A wireless repeater 756 may be positioned in the coverage area of two or more base stations 752, 754. In most cellular communication systems, such as GSM, UMTA or CDMA, the base stations transmit a reference signal or a pilot signal that is unique to each base station. For example, in CDMA based communication systems, a pilot signal is an unmodulated, direct-sequence spread spectrum signal transmitted continuously by each CDMA base station. The pilot signal is comprised of a pseudo-random code (the "pilot code"), also referred to as pseudo-noise (PN). The pilot code is sometimes referred to as a "spreading code" being the code used to spread the bandwidth of the signal to be transmitted and is independent of the data. More specifically, in a cellular communication system, the base stations transmit the same PN code but each base station is assigned with a different offset to allow mobile devices to identify the base station by the PN code offset. In the present description, the reference signal or unique pilot signal refers to the pilot signal transmitted with each base station having the same PN code but with a different code offset. In the present illustration, base station 752 transmits a pilot signal with a pseudo-random code PN1 while base station 754 transmits a pilot signal with a pseudo-random code PN2. In the present illustration, pilot codes PN1 and PN2 represent the same pseudo-random code but at different offset or different phase shift.

The pilot signals are typically transmitted at a constant power level to provide a fixed reference for receivers within its coverage area, such as mobile stations or repeaters. A receiver, such as a mobile station or a repeater, listens to the pilot signals of the base stations to search for a base station with the strongest correlated power level. In a normal communication environment, the pilot signal is used by the receivers for various connection operations, such as to acquire the timing of the CDMA link, to provide a phase reference, and to determine the signal strength.

A wireless repeater deployed in a cellular system has the capability to communicate with multiple base stations. However, when there are too many pilot signals observed in an area, pilot pollution occurs. Hearing unnecessary pilot signals reduce the received energy per chip over the power density ($E_C/I_0$) from the intended base station, consequently reducing the quality of the desired connection. For instance, as shown in FIG. 5, repeater 756 is within the coverage area of both base station 752 and base station 754. If base station 752 is the intended base station for repeater 756, then the pilot signal transmitted by base station 754 becomes interference to repeater 756, degrading the quality of the signal received by repeater 756 from base station 752.

According to one aspect of the present invention, repeater 756 employs an antenna array and implements the antenna weight computation method of the present invention to reduce interference due to pilot pollution and improve signal reception. More specifically, repeater 756 applies the antenna weight computation method of the present invention to modify the spatial selectivity of the antenna array so as to steer the antenna array of the repeater to be more receptive to transmission from one base station (such as base station 752) over transmission from other surrounding base stations (such as base station 754), thereby improving the quality of the receive signals from the intended base station.

In an antenna array, the signal from each antenna element can be multiplied by a different weight to achieve the desired antenna spatial selectivity. In the present description, array weights refer to the complex values (e.g. W=a+jb) used to multiply the receive signal of each antenna element. The weighted receive signals of all the antenna elements are combined to form the antenna beam. When the array weights are chosen properly, the antenna beam can be steered in such a way so as to cancel energy from undesirable directions and emphasis energy from desired directions. That is, the antenna beam can be steered by changing the antenna weights to change the direction of maximum reception.

Figure 6:
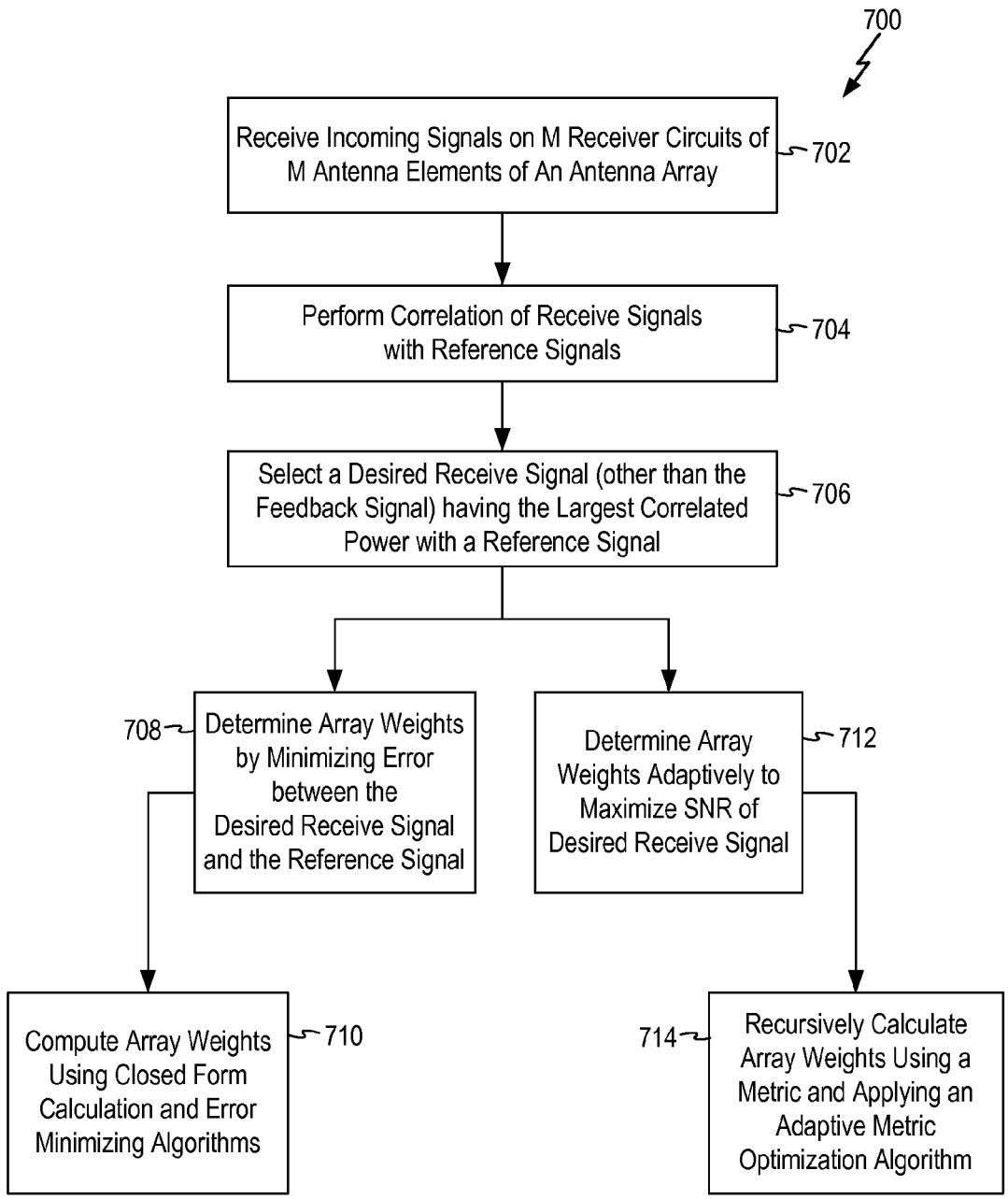
FIG. 6 is a flow chart illustrating an adaptive antenna weight computation method in a repeater employing an antenna array for improving signal reception according to one embodiment of the present invention.

FIG. 6 is a flow chart illustrating an antenna weight computation method implemented in a repeater employing an antenna array for improving signal reception according to one embodiment of the present invention. Referring to FIG. 6, antenna weight computation method 700 is implemented in a repeater employing an antenna array including M antenna elements. Each of the M antenna elements is coupled to a transceiver circuit of the repeater to process incoming and outgoing signals. More specifically, each transceiver circuit includes a receiver circuit to receive the incoming receive signal from the associated antenna element and a transmitter circuit to provide the outgoing transmitted signal to the associated antenna element. At step 702, the repeater receives incoming signals from the operating environment on M receiver circuits associated with M antenna elements of the antenna array. The incoming signals can include remote signals from nearby base stations and the feedback signal from the repeater's own antennas.

Method 700 performs correlation of the receive signals with one or more reference signals (step 704). When the repeater is deployed in a CDMA based communication system, the reference signals are the known pilot signals or known pilot codes or known pilot code phases of the base stations in the system. Pilot code phases refer to the same pilot code with known code offsets. When the repeater is deployed in a WCDMA based communication system, the reference signals are the known scrambling codes of the base stations in the system. Finally, when the repeater is deployed in a non-CDMA based communication system, the reference signals are some or all of the pilot tones in an OFDM symbol or an OFDM preamble. In other communication systems, the known pilot codes or pilot signals used in those systems can be used as the reference signals. Method 700 computes the correlated power or correlated energy of the receive signals corresponding to the one or more reference signals, such as one or more pilot codes or pilot tones.

From the correlation results, method 700 selects a desired receive signal being the receive signal, other than the feedback signal, having the largest correlated power with a reference signal, such as a known pilot code phase (step 706). That is, the desired receive signal is selected from the receive signals excluding the leakage or feedback signals at the repeater, if any. It is instructive to note that in some repeaters, the antenna weights are determined after echo cancellation is carried out, while in other repeaters, the antenna weights are determined before echo cancellation or without echo cancellation. In the case when antenna weights are determined before or without echo cancellation, the largest correlated power detected by method 700 could be the feedback signal from the repeater itself. Any leakage or feedback signals should be excluded when selecting the desired receive signal. Accordingly, in one embodiment, the desired receive signal is determined by searching for the signal with the largest correlated power a delay D prior to the signal with the overall largest correlated power level, the signal with the overall largest correlated power being the feedback signal, where delay D represents the delay through the repeater.

Figure 7:
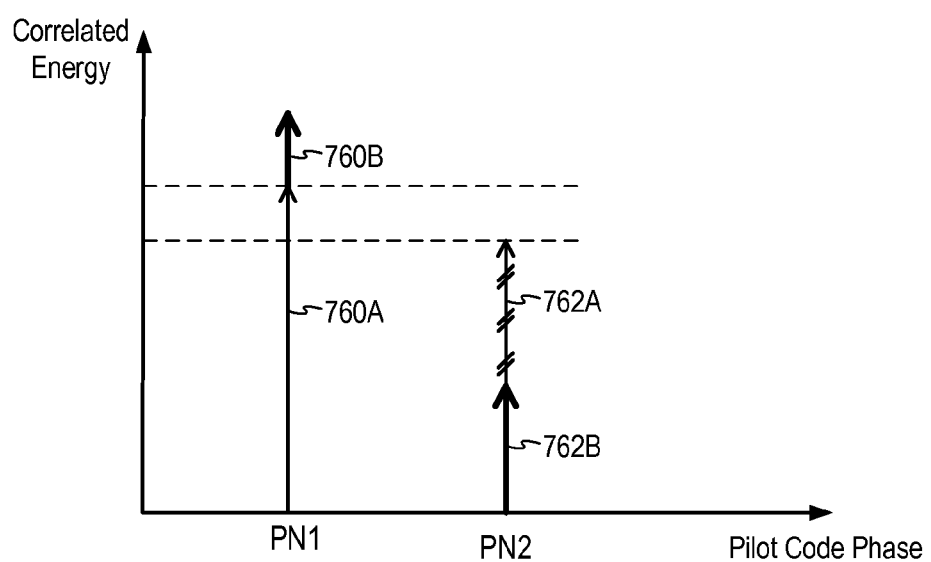
FIG. 7 illustrates the correlation results obtained for the repeater in the operating environment of FIG. 5.

FIG. 7 illustrates the correlation results obtained for the repeater 756 in operating environment 750 of FIG. 5. Referring to FIG. 7, repeater 756 receives incoming signals from base stations 752 and 754. The correlation of a first receive signal with pilot code PN1 gives a correlated energy level denoted by line 760A while the correlation of a second receive signal with pilot code PN2 gives a correlated energy level denoted by line 762A. The correlated energy 760A is greater than the correlated energy 762A. Thus, the first receive signal corresponding to pilot code PN1 will be selected as the desired receive signal.

Once the desired receive signal is selected, method 700 determines the weights to be used with each of the M antenna elements (the "array weights") in order to steer the antenna beam for improving spatial selectivity. The array weights can be determined using various algorithms and metrics.

In some embodiments, the array weights are determined by minimizing the error between the desired receive signal and the reference signal (step 708). More specifically, in some embodiments, the array weights are calculated in closed form using an error minimizing algorithm (step 710). In one embodiment, closed form calculation using a minimum mean square error (MMSE) algorithm is used to determine the array weights. More specifically, the antenna weights are computed in closed form to minimize the mean square error between the desired receive signal and the reference signal (the known pilot signal or pilot code phase). The MMSE algorithm is applied to select antenna weights so that the desired receive signal looks as close as possible to the reference signal in phase and in magnitude. For example, in the operating environment 750 (FIG. 5), the array weights are calculated in closed form to minimize the mean square error between the desired receive signal at repeater 756 and the pilot signal containing pilot code phase PN1. In other embodiments, other closed form algorithm can be used to compute the array weights.

In alternate embodiments, the array weights are determined adaptively to maximize the signal-to-noise ratio (SNR) of the desired receive signal (step 712). In some embodiments, the array weights are computed recursively using a metric and an adaptive metric optimization algorithm (step 714). That is, a metric is provided to estimate the SNR of the desired receive signal and the antenna weights are recursively computed to optimize the predetermined metric. In some embodiments, the metric used is the ratio of the correlated power of the desired receive signal to the sum of the correlated power of some or all of the other receive signals. In one embodiment, the metric sums only the dominant non-desired receive signals as the denominator of the ratio where the dominant non-desired receive signals refer to receive signals other than the desired receive signal having a correlated power level above a predetermined threshold. Furthermore, in one embodiment, a steepest descent algorithm is used to recursively determine the antenna weights while optimizing the metric. The construction of the metric to be used will be described in more detail below. The use of a steepest descent algorithm is illustrative only. In other embodiments, other adaptive metric optimization algorithm can be used.

It is imperative to note that the error minimizing computation method (steps 708-710) and the SNR maximizing computation method (steps 712-714) represent alternate methods for determining the array weights of the antenna array. They are both shown in the flowchart of FIG. 7 to illustrate the alternate methods but method 700 can be implemented with one or the other array weight computation method and does not need to implement both array weight computation methods at the same time.

As a result of the antenna weight computation method, the antenna array of the repeater is steered to maximize reception in the direction of the desired receive signal and minimize reception from the interfering non-desired signals. In this manner, interference from neighboring cells is reduced. For instance, in the repeater environment 750 of FIG. 5, the antenna array of repeater 756 is steered to be more selective to the signals from base station 752 and less selective to signals from base station 754. In operation, antenna weight computation method 700 has the effect of increasing the correlated energy of the desired receive signal with pilot code PN1 while suppressing or reducing the correlated energy of the other receive signals, such as the second receive signal with pilot code PN2. Thus, referring to FIG. 7, as a result of the antenna weight computation, the correlated energy of the desired receive signal is increased to a level denoted by line 760B while the correlated energy of the non-desired receive signal is decreased to a level denoted by line 762B. In this manner, the SNR of the desired receive signal is improved.

Array Weight Computation Using Adaptive Metric Optimization

The use of a metric and an adaptive metric optimization algorithm in the adaptive antenna weight computation method of the present invention will now be described in more detail. In embodiments of the antenna weight computation method of the present invention, an adaptive metric optimization algorithm is applied to compute the antenna weights recursively with the goal of optimizing a predetermined metric. In embodiments of the present invention, the metric being applied is a metric that estimates the SNR of the desired receive signal and the metric is optimized to maximize the SNR. In one embodiment, the metric being optimized is given as the ratio of the correlated power of the desired receive signal to the sum of the correlated power of some or all of the other receive signals. The derivation of the metric is illustrated in FIG. 8 for the case where the array weights are determined after echo-cancellation and in FIG. 9 for the case where the array weights are determined before echo-cancellation.

Figure 8:
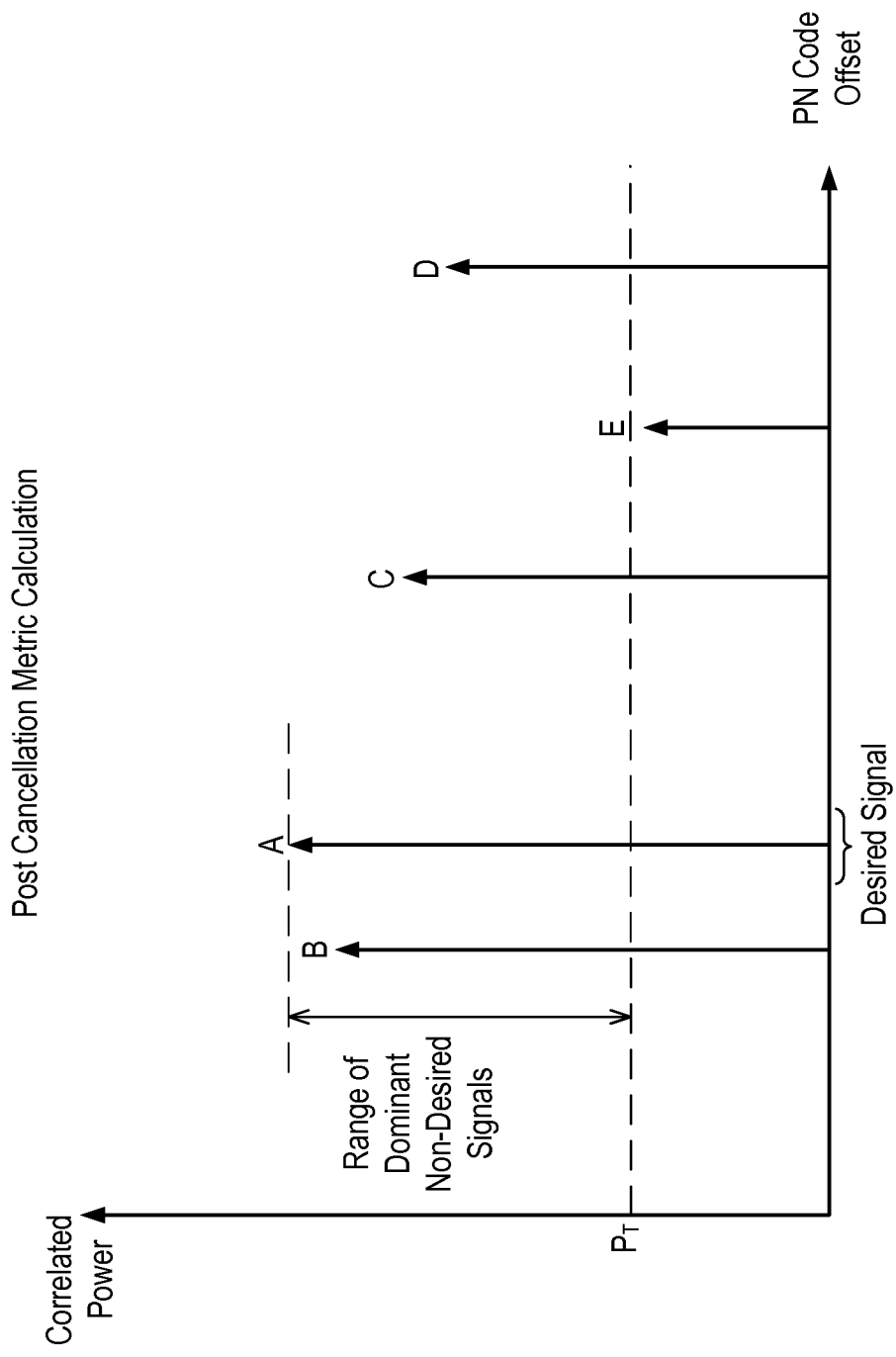
FIG. 8 illustrates the correlated power computed for incoming signals received at a repeater employing an antenna array in an operating environment including multiple signal sources, such as multiple base stations according to one embodiment of the present invention.

FIG. 8 illustrates the correlated power computed for incoming signals received at a repeater employing an antenna array in an operating environment including multiple signal sources, such as multiple base stations, according to one embodiment of the present invention. In the present illustration, the repeater is assumed to implement echo cancellation and the incoming feedback signals have been echo cancelled before the array weights are to be determined Referring to FIG. 8, the repeater receives five incoming signals corresponding to pilot signals with five pilot codes or pilot signals with five different PN code offsets of a PN code sequence. The five receive signals with the corresponding pilot codes or pilot code offsets are denoted by reference numerals A to E. In one embodiment, a metric for antenna weight adaptation is constructed by using the correlated power of the desired receive signal as the numerator. In the present illustration, the desired receive signal is signal A, being the signal with the largest correlated power. More specifically, in one embodiment, the absolute value of the correlated power of the desired receive signal is taken and is squared to use as the numerator of the metric.

In one embodiment, the metric for antenna weight adaptation is constructed using the sum of the correlated power of all other receive signals as the denominator. That is, the sum of the correlated power of signals B to E is used as the denominator of the metric. In another embodiment, an enhanced metric is provided where the metric is constructed using only the dominant non-desired receive signals as the denominator. The dominant non-desired receive signals are the receive signals other than the desired receive signal having a correlated power level above a threshold level $P_T$ (such as 20 dB). In the present illustration, signals B, C and D are the dominant non-desired receive signals and their correlated powers are summed to be used as the denominator of the metric. Signal E, on the other hand, has a correlated power level less than the threshold level $P_T$ and is therefore not included in the metric computation. The denominator of the metric, whether computed using some or all of the receive signals other than the desired receive signals, establishes the non-desired signal level received at the repeater.

Accordingly, in one embodiment, the metric for antenna weight adaptation is given as:

$$\text{Metric} = \frac{|Pwr(A)|^2}{\sum Pwr(\text{all above } P_T)},$$

where Pwr(A) denotes the correlated power of the desired receive signal with the largest correlated power and Pwr(all above $P_T$) denotes the correlated power of all other receive signals having a correlated power greater than the threshold level $P_T$, also referred as the dominant non-desired receive signals. The above-described metric can then be optimized using various adaptive metric optimization algorithms, such as steepest descent based algorithms.

In the present embodiment, the metric is computed by using all dominant non-desired receive signals. In other embodiments, only some or a subset of the dominant non-desired receive signals are summed for use as the denominator of the metric. It is not critical to use all of the dominant non-desired receive signals in the metric computation.

Figure 9:
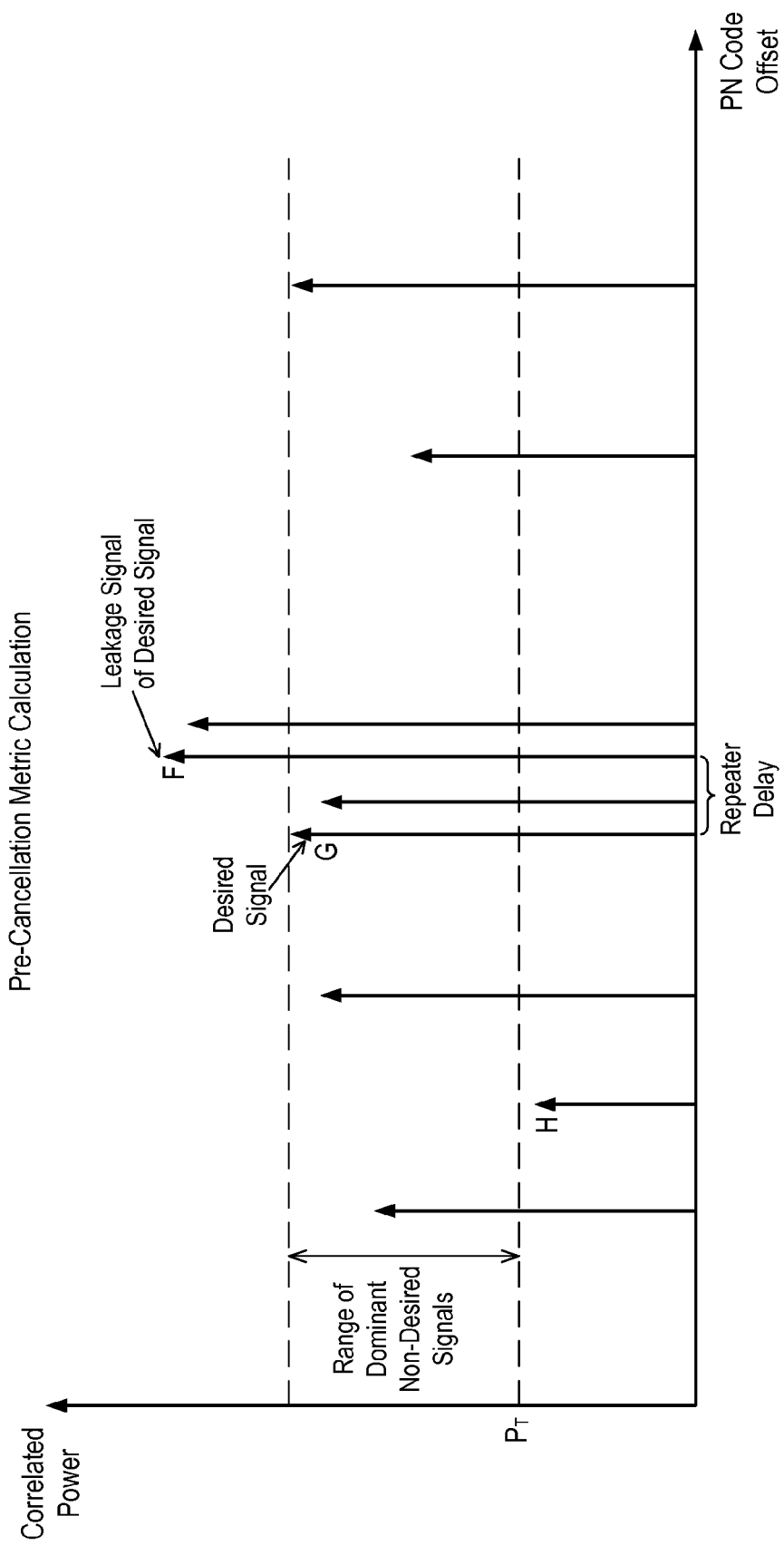
FIG. 9 illustrates the correlated power computed for incoming signals received at a repeater employing an antenna array in an operating environment including multiple signal sources, such as multiple base stations according to another embodiment of the present invention.

FIG. 9 illustrates the correlated power computed for incoming signals received at a repeater employing an antenna array in an operating environment including multiple signal sources, such as multiple base stations, according to another embodiment of the present invention. In the present illustration, the repeater is assumed to determine the array weights before echo cancellation or does not implement echo cancellation. The incoming feedback signals, if any, have not been echo cancelled before the array weights are to be determined Referring to FIG. 9, the repeater receives multiple incoming signals corresponding to various pilot code phases or various PN code offsets. The receive signals include feedback signals from the repeater itself. In one embodiment, a metric for antenna weight adaptation is constructed by using the correlated power of the desired receive signal as the numerator. Before echo cancellation is performed or when echo cancellation is not performed, the feedback signal from the repeater (signal F) will be the signal with the largest correlated energy. In that case, the desired receive signal is selected by searching for the signal with the largest correlated power a delay D prior to the signal with the overall largest correlated power level, the signal with the overall largest correlated power being the feedback signal, where delay D represents the delay through the repeater. In the present illustration, signal G is the signal with the largest correlated power a repeater delay D prior to the largest feedback signal F. Thus, signal G is selected as the desired receive signal. More specifically, in one embodiment, the absolute value of the correlated power of the desired receive signal is taken and is squared to use as the numerator of the metric.

In one embodiment, the metric for antenna weight adaptation is constructed using the sum of the correlated power of all other receive signals as the denominator. In another embodiment, an enhanced metric is provided where the metric is constructed using only the dominant non-desired receive signals as the denominator. The dominant non-desired receive signals are the receive signals other than the desired receive signal having a correlated power level above a threshold level $P_T$ (such as 20 dB). In the present illustration, all other receive signals except for signal H are the dominant non-desired receive signals and their correlated powers are summed to be used as the denominator of the metric.

In this manner, a metric for antenna weight adaptation is constructed using the desired receive signal with the largest correlated power excluding the feedback signal as the numerator and using the other correlated power above a given threshold as the denominator. In one embodiment, the metric is given as:

$$\text{Metric} = \frac{|Pwr(G)|^2}{\sum Pwr(\text{all about } P_T)},$$

where Pwr(G) denotes the correlated power of the desired receive signal with the largest correlated power, excluding the feedback signal, and Pwr(all above $P_T$) denotes the correlated power of all other receive signals having a correlated power greater than the threshold level $P_T$, also referred as the dominant non-desired receive signals. The above-described metric can then be optimized using various adaptive metric optimization algorithms, such as steepest descent based algorithms.

In the present embodiment, the metric is computed by using all dominant non-desired receive signals. In other embodiments, only some or a subset of the dominant non-desired receive signals are summed for use as the denominator of the metric. It is not critical to use all of the dominant non-desired receive signals in the metric computation.

In some embodiments of the present invention, a steepest descent algorithm is applied to optimize the above-described metrics. The steepest descent algorithm is applied recursively to compute the weights for the antenna elements to maximize the metric, thereby maximizing the SNR or $E_C/I_0$ of the desired receive signal. In general, the steepest descent algorithm refers to an algorithm for numerically finding the minimum value of a function (the metric), based on the gradient of the function. Each successive iteration of the algorithm moves along the direction where the function is increasing or decreasing most rapidly and recomputes the gradient to determine the new direction to travel.

According to one aspect of the present invention, the adaptive metric optimization algorithm is applied for both echo cancellation and for interference reduction. That is, the metric is optimized to reduce the feedback signal as well as to reduce the interference from neighboring signal sources. More specifically, when the total SNR or $E_C/I_0$ is maximized, the array weights will also effectively reduce the feedback signal to desired receive signal level.

Implementations of the antenna weight computation method in a wireless repeater using either the error minimizing approach or the SNR maximizing approach will now be described in more detail.

Array Weight Computation Using Error Minimizing Algorithms

Figure 10:
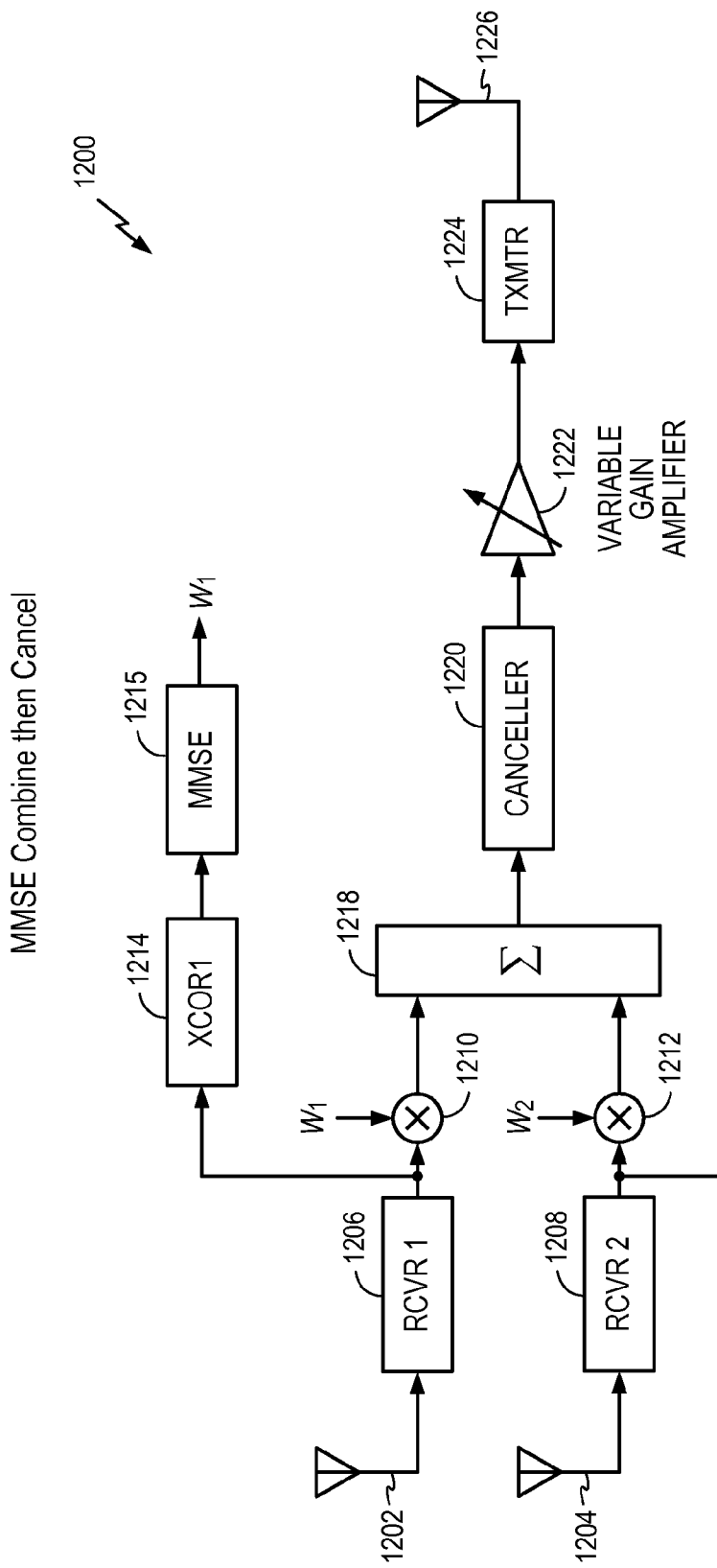
FIG. 10 is a schematic diagram of a repeater employing an antenna array and employing echo cancellation after the antenna weights are determined according to one embodiment of the present invention.
Figure 11:
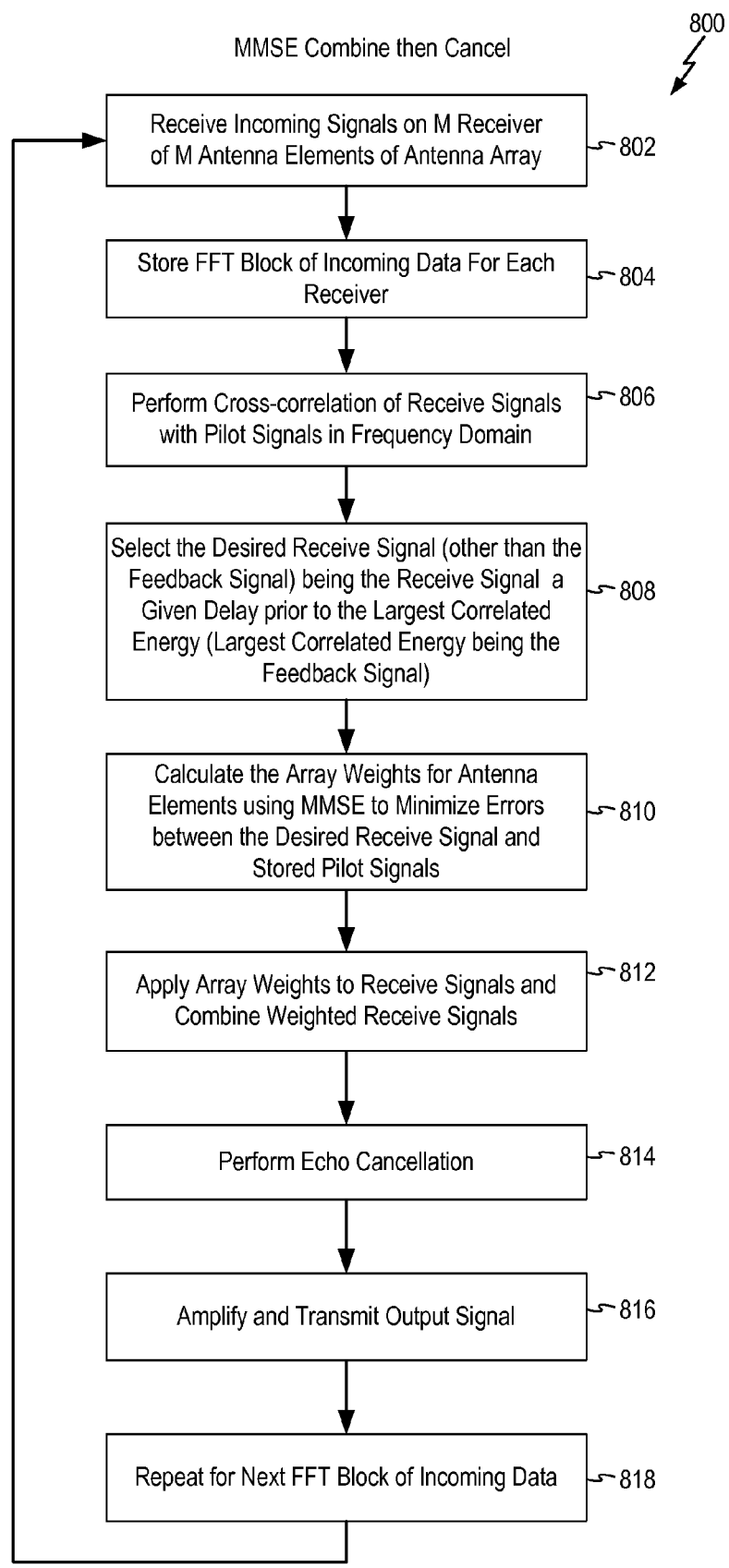
FIG. 11 is a flowchart illustrating an adaptive antenna weight computation method implemented in the repeater of FIG. 10 using closed form MMSE algorithm according to one embodiment of the present invention.

FIG. 10 is a schematic diagram of a repeater employing an antenna array and employing echo cancellation after the antenna weights are determined using the antenna weight computation method according to one embodiment of the present invention. FIG. 11 is a flowchart illustrating the antenna weight computation method implemented in the repeater of FIG. 10 using closed form MMSE algorithm according to one embodiment of the present invention. The antenna weight computation method of FIG. 11 is referred to as "MMSE Combine then Cancel" to refer to the use of closed form calculation with a MMSE algorithm in a repeater that combine the array data before performing echo cancellation. The operation of the MMSE Combine then Cancel antenna weight computation method 800 as implemented in repeater 1200 will now be described with reference to both FIGS. 10 and 11.

Repeater 1200 includes an antenna array formed by a first antenna element 1202 and a second antenna element 1204. First and second receiver circuits RCVR1 and RCVR2 (1206, 1208) are coupled to the first and second antenna elements respectively. Method 800 receives incoming signals from the operating environment on M receiver circuits (RCVR1, RCVR2) associated with M antenna elements 1202, 1204 of the antenna array (step 802). The incoming signals can include remote signals from nearby base stations and feedback signals from the repeater's own antennas.

The incoming signals are provided to correlation blocks 1214 and 1216 to compute the correlation of the incoming signals with known pilot signals (or pilot code phases). In the present embodiment, the correlation is performed in the frequency domain and thus correlation blocks 1214 and 1216 include storage elements to store an FFT (Fast Fourier Transform) block of data for each receiver circuit (step 804). Then, method 800 performs cross-correlation of the receive signals with the known pilot signals or pilot code phases in frequency domain (step 806). The correlation results are then used to compute the array weights $W_1$ and $W_2$ (complex) using closed form calculation with a MMSE algorithm as follows. First, method 800 selects the desired receive signal being the receive signal a given delay prior to the receive signal with the overall largest correlated energy, the signal with the overall largest correlated energy being the feedback signal (step 808). The amount of delay is determined by the signal delay through repeater 1200. The correlation blocks 1214 and 1216 can be implemented in software, hardware, firmware or a combination thereof, including signal processors.

Once the desired receive signal is selected, the array weights $W_1$ and $W_2$ for the antenna elements 1202, 1204 are calculated at MMSE algorithm blocks 1215, 1217 (step 810). MMSE algorithm blocks 1215, 1217 can be implemented as signal processors, such as digital signal processors and can include memory and computational elements. More specifically, method 800 calculates the array weights $W_1$ and $W_2$ for the antenna elements 1202, 1204 using a MMSE algorithm to minimize the mean square error between the desired receive signal and the associated pilot signal or pilot code phase.

When array weights $W_1$ and $W_2$ are determined, they are provided to multipliers 1210 and 1212 to multiply the respective receive signals, thereby steering the antenna reception. Multipliers 1210 and 1212 can be implemented as data converters and can also be implemented in software, hardware or firmware or a combination thereof. The weighted receive signals are then combined at combiner 1218 (step 812). The combined receive signal is then provided to echo canceller 1220 for echo cancellation (step 814). The echo cancelled signal is amplified by variable gain amplifier 1222 and provided to the transmitter circuit 1224 for transmission on an antenna element 1226 (step 816). Method 800 can then be repeated for the next FFT block of data from the incoming signals (step 818).

Figure 12:
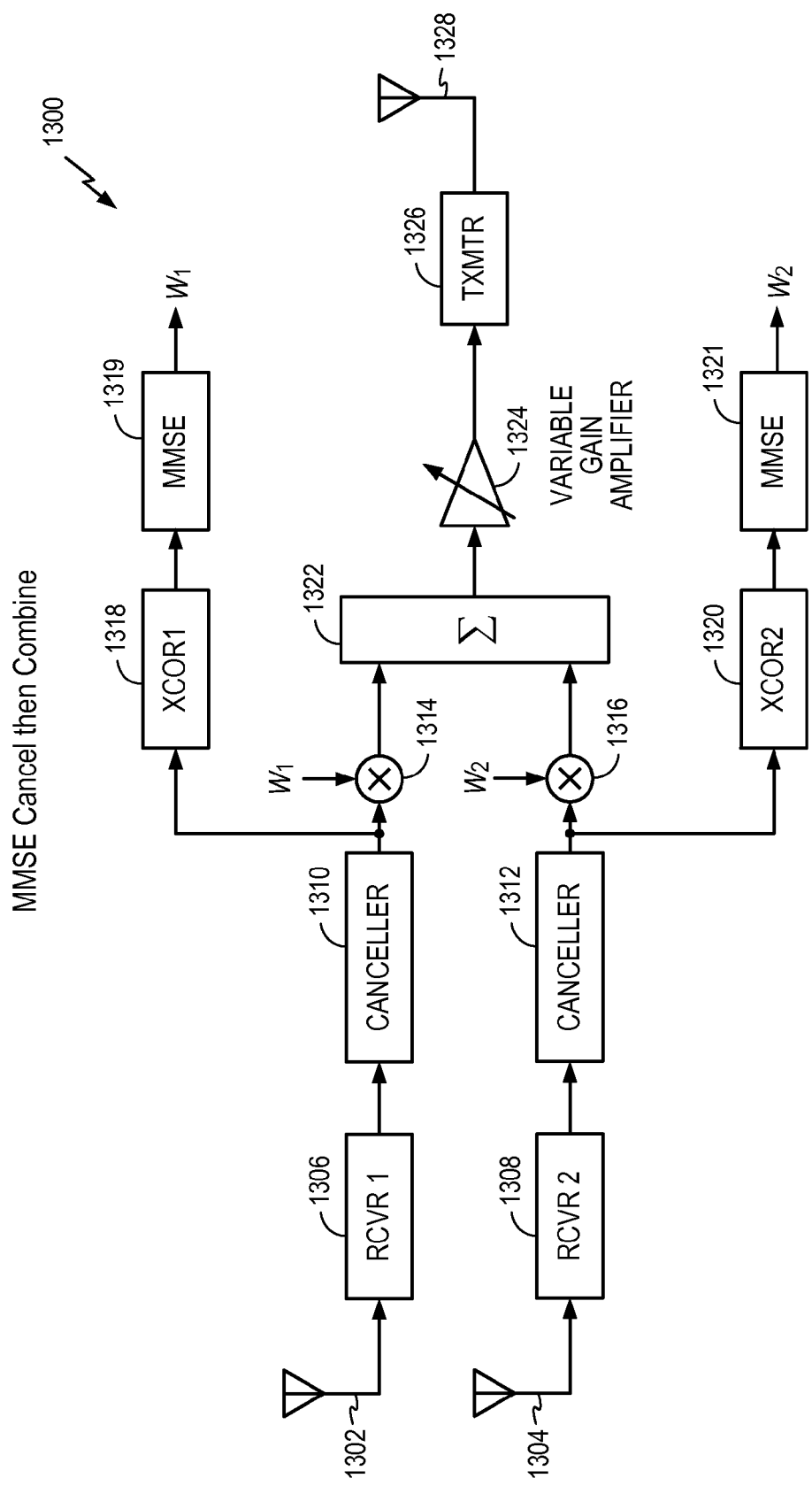
FIG. 12 is a schematic diagram of a repeater employing an antenna array and employing echo cancellation before the antenna weights are determined according to one embodiment of the present invention.
Figure 13:
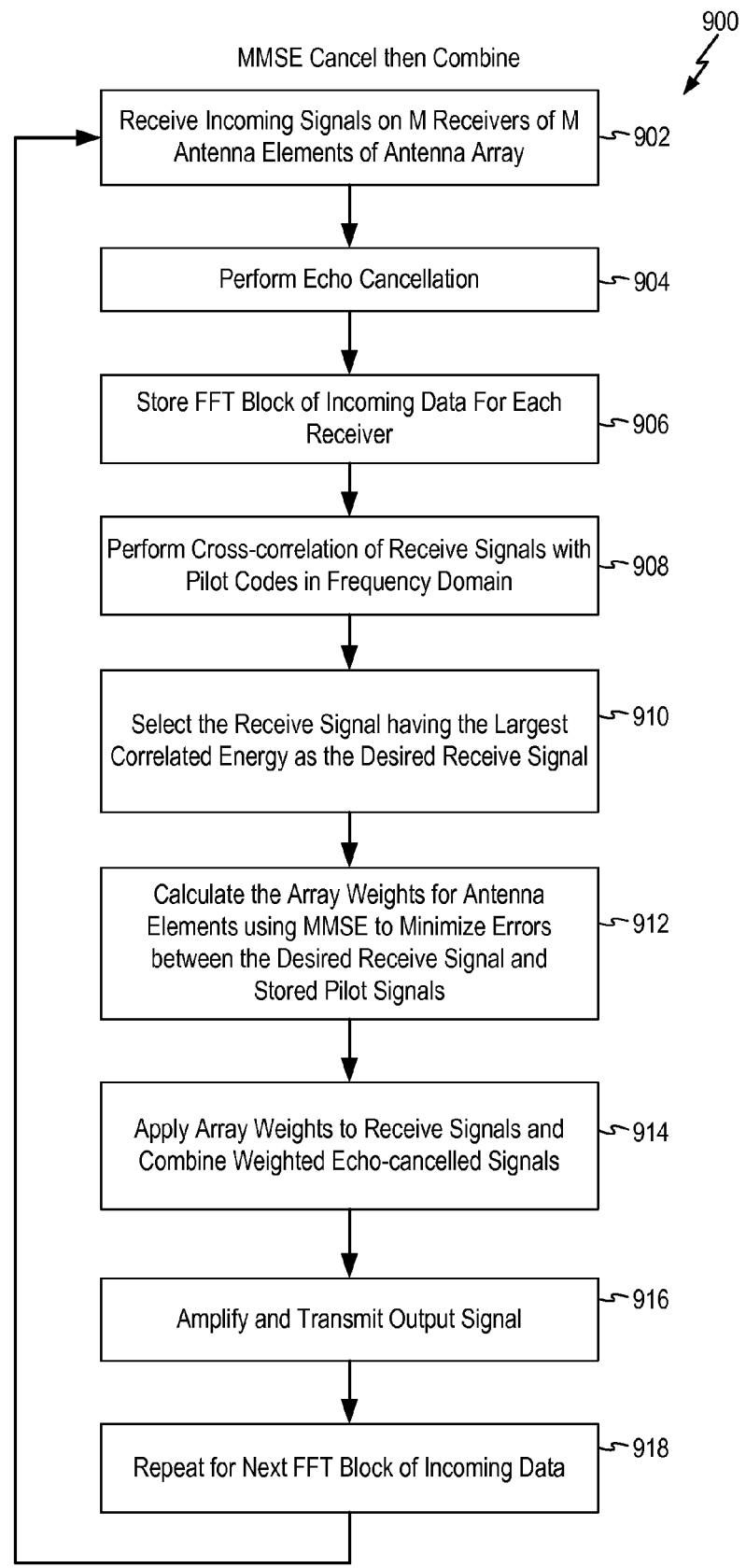
FIG. 13 is a flowchart illustrating an adaptive antenna weight computation method implemented in the repeater of FIG. 12 using closed form MMSE algorithm according to one embodiment of the present invention.

FIG. 12 is a schematic diagram of a repeater employing an antenna array and employing echo cancellation before the antenna weights are determined using the antenna weight computation method according to one embodiment of the present invention. FIG. 13 is a flowchart illustrating an antenna weight computation method implemented in the repeater of FIG. 12 using closed form MMSE algorithm according to one embodiment of the present invention. The antenna weight computation method of FIG. 13 is referred to as "MMSE Cancel then Combine" to refer to the use of closed form calculation with a MMSE algorithm in a repeater that perform echo cancellation before combining the array data. The operation of the MMSE Cancel then Combine antenna weight computation method 900 as implemented in repeater 1300 will now be described with reference to both FIGS. 12 and 13.

Repeater 1300 includes an antenna array formed by a first antenna element 1302 and a second antenna element 1304. First and second receiver circuits RCVR1 and RCVR2 (1306, 1308) are coupled to the first and second antenna elements respectively. Method 900 receives incoming signals from the operating environment on M receiver circuits (RCVR1, RCVR2) associated with M antenna elements 1302, 1304 of the antenna array (step 902). The incoming signals can include remote signals from nearby base stations and feedback signals from the repeater's own antennas.

The incoming signals at each receiver circuit 1306, 1308 are provided to echo cancellers 1310, 1312 for echo cancellation where the feedback signal components of the incoming signals are removed or substantially removed (step 904). The echo-cancelled signals are then provided to correlation blocks 1318 and 1320 to compute the correlation of the echo-cancelled signals with known pilot signals or known pilot code phases. In the present embodiment, the correlation is performed in the frequency domain and thus correlation blocks 1318 and 1320 include storage elements to store an FFT (Fast Fourier Transform) block of data for each receiver circuit (step 906). Then, method 900 performs cross-correlation of the receive signals with known pilot signal or known pilot code phases in frequency domain (step 908). The correlation results are then used to compute the array weights $W_1$ and $W_2$ using closed form calculation with a MMSE algorithm as follows. First, method 900 selects the desired receive signal being the receive signal having the largest correlated energy (step 910).

Once the desired receive signal is selected, the array weights $W_1$ and $W_2$ for the antenna elements 1302, 1304 are calculated at MMSE algorithm blocks 1319, 1321 (step 912). More specifically, method 900 calculates the array weights $W_1$ and $W_2$ for the antenna elements 1302, 1304 using a MMSE algorithm to minimize the mean square error between the desired receive signal and the associated pilot signal or pilot code phases.

When array weights $W_1$ and $W_2$ are determined, they are provided to multipliers 1314 and 1316 to multiply the respective echo-cancelled signals, thereby steering the antenna reception (step 914). The weighted echo-cancelled signals are then combined at combiner 1322. The combined signal is amplified by variable gain amplifier 1324 and provided to the transmitter circuit 1326 for transmission on an antenna element 1328 (step 916). Method 900 can then be repeated for the next FFT block of data from the incoming signals (step 918).

Array Weight Computation Using Adaptive Metric Optimization

Figure 14:
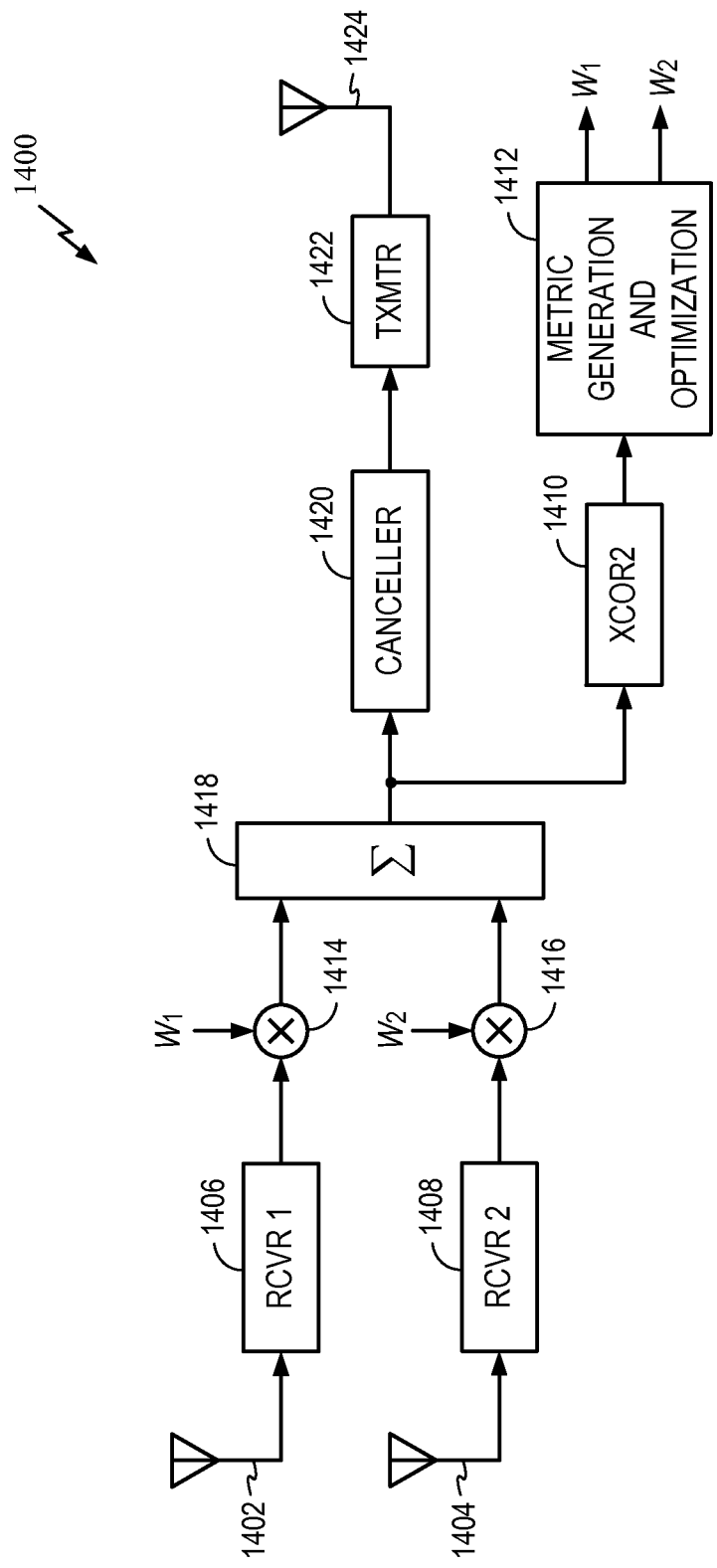
FIG. 14 is a schematic diagram of a repeater employing an antenna array and employing echo cancellation after the antenna weights are determined according to one embodiment of the present invention.
Figure 15:
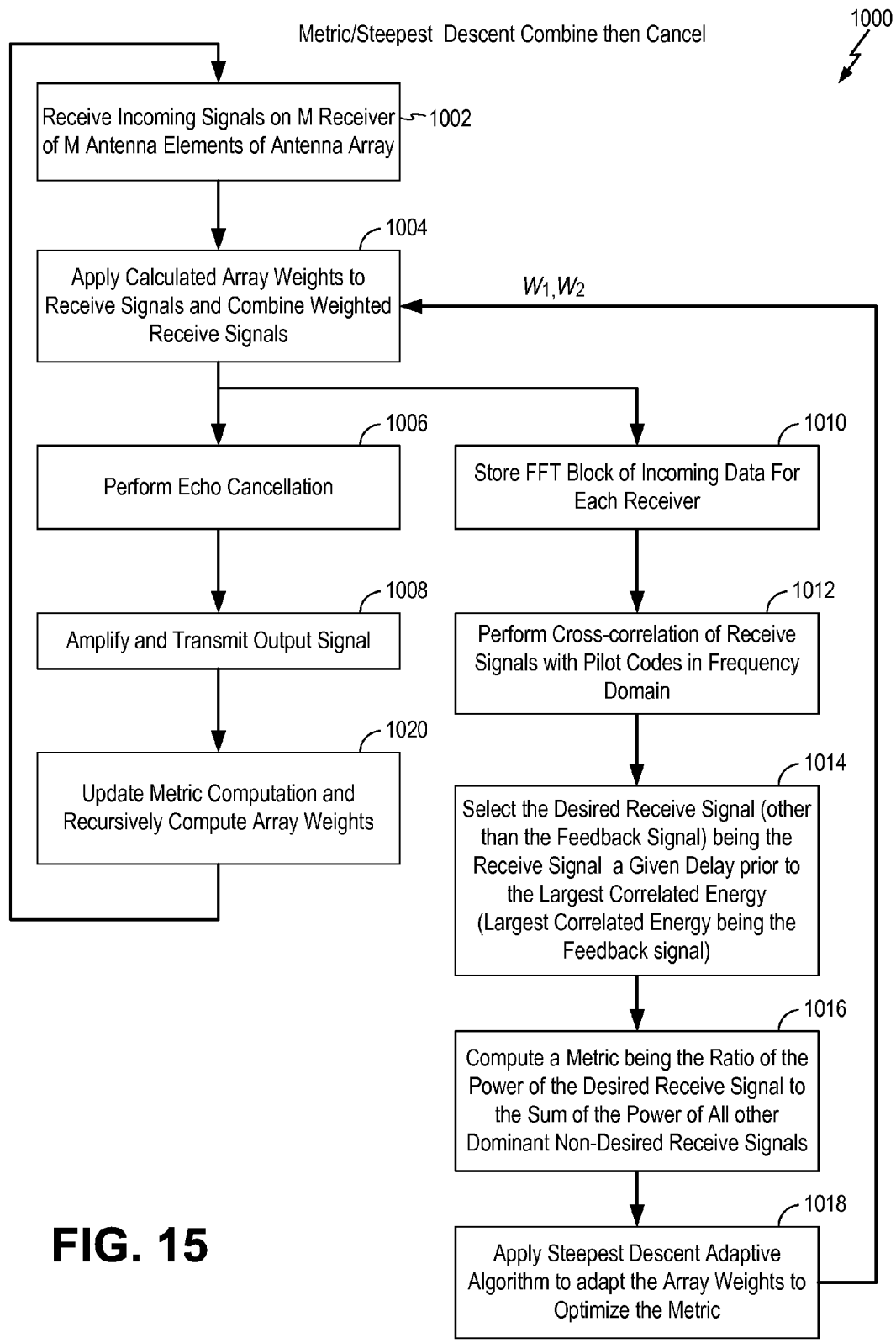
FIG. 15 is a flowchart illustrating an adaptive antenna weight computation method implemented in the repeater of FIG. 14 using a metric with a metric optimization algorithm according to one embodiment of the present invention.

FIG. 14 is a schematic diagram of a repeater employing an antenna array and employing echo cancellation after the antenna weights are determined using the antenna weight computation method according to one embodiment of the present invention. FIG. 15 is a flowchart illustrating an antenna weight computation method implemented in the repeater of FIG. 14 using a metric with a metric optimization algorithm according to one embodiment of the present invention. The antenna weight computation method of FIG. 15 is referred to as "Metric/Steepest Descent Combine then Cancel" to refer to the use of a metric with a steepest descent algorithm in a repeater that combine the array data before performing echo cancellation. The operation of the Metric/Steepest Descent Combine then Cancel antenna weight computation method 1000 as implemented in repeater 1400 will now be described with reference to both FIGS. 14 and 15.

Repeater 1400 includes an antenna array formed by a first antenna element 1402 and a second antenna element 1404. First and second receiver circuits RCVR1 and RCVR2 (1406, 1408) are coupled to the first and second antenna elements respectively. Method 1000 receives incoming signals from the operating environment on M receiver circuits (RCVR1, RCVR2) associated with M antenna elements 1402, 1404 of the antenna array (step 1002). The incoming signals can include remote signals from nearby base stations and feedback signals from the repeater's own antennas.

The incoming signals are provided to multipliers 1414 and 1416 to be multiplied with the respective array weights $W_1$ and $W_2$, thereby steering the antenna reception (step 1004). Because antenna weight computation method 1000 is an adaptive computation method, the antenna weights are recursively calculated to optimize the metric. Therefore, at any point in the operation of repeater 1400, the most recently computed values for array weights $W_1$ and $W_2$ are used at multipliers 1414, 1416. The values for array weights $W_1$ and $W_2$ are updated at each metric optimization calculation.

The weighted receive signals are then combined at combiner 1418. The combined receive signal is then provided to echo canceller 1420 for echo cancellation (step 1006). The echo cancelled signal is amplified by variable gain amplifier and provided to the transmitter circuit 1422 for transmission on an antenna element 1424 (step 1008).

Meanwhile, the combined receive signal, before echo cancellation, is provided to a correlation block 1410 to compute the correlation of the combined receive signal with known pilot codes or known pilot code phases. In the present embodiment, the correlation is performed in the frequency domain and thus correlation block 1410 includes storage elements to store an FFT (Fast Fourier Transform) block of data for each receiver (step 1010). Then, method 1000 performs cross-correlation of the receive signals with known pilot codes or known pilot code phases in frequency domain (step 1012). The correlation results are then provided to metric generation and optimization block 1412 to compute the array weights $W_1$ and $W_2$ using a metric and a metric optimization algorithm as follows. Metric generation and optimization block 1412 can be implemented as signal processors, such as digital signal processors and can include memory and computational elements.

First, method 1000 selects the desired receive signal being the receive signal a given delay prior to the receive signal with the overall largest correlated energy, the signal with the overall largest correlated energy being the feedback signal (step 1014). The amount of delay is determined by the signal delay through repeater 1400. Then, a metric is computed based on the desired receive signal (step 1016). In one embodiment, the metric is given as the ratio of the correlated power of the desired receive signal to the sum of the correlated power of all or some of the other receive signals. Then, a metric optimization algorithm, such as a steepest descent adaptive algorithm is applied to adaptively compute the array weights $W_1$ and $W_2$ for the antenna elements 1402, 1404 with the goal of optimizing the metric (step 1018). The computed array weights $W_1$ and $W_2$ are then provided to multipliers 1414 and 1416 to apply the newly calculated array weights to the incoming receive signals. Method 1000 can then be repeated for the next FFT block of data to update the metric computation (step 1020). The steepest descent algorithm is recursively apply to compute the array weights while the metric is optimized.

Figure 16:
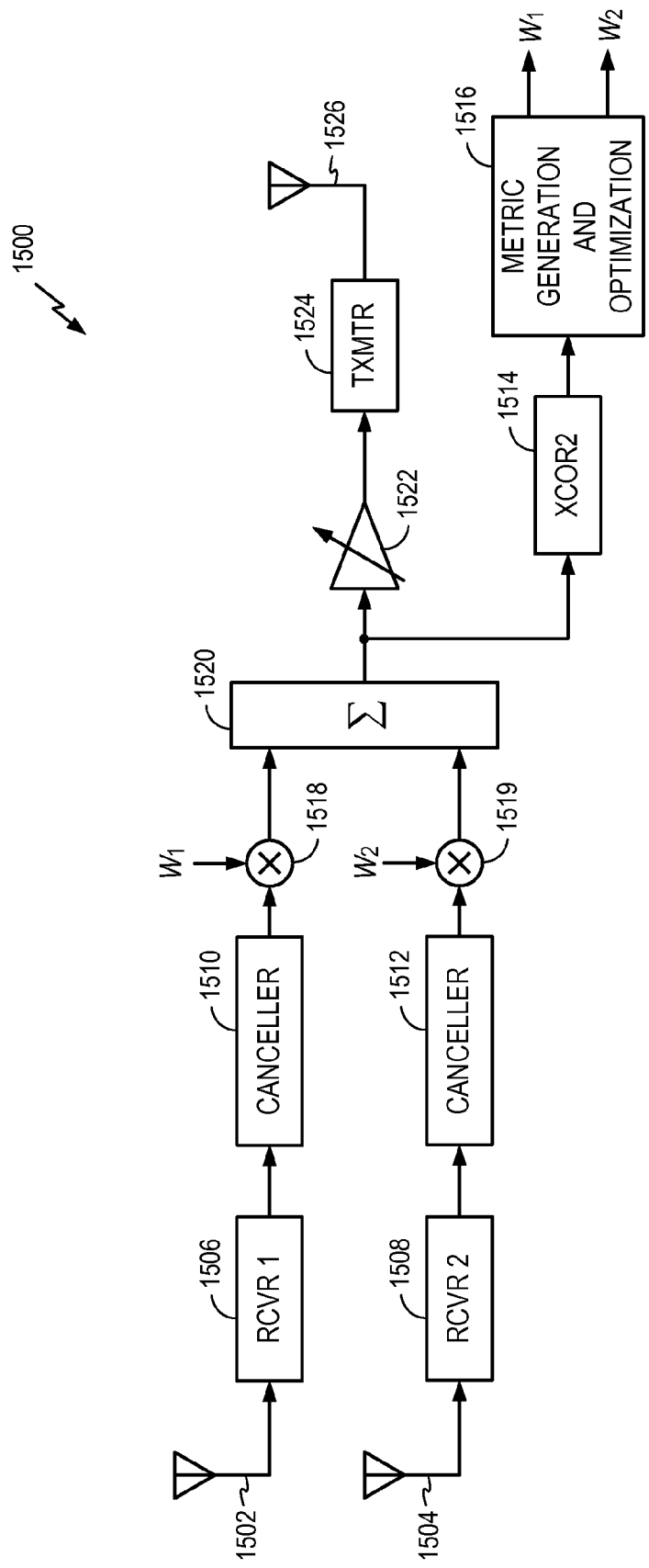
FIG. 16 is a schematic diagram of a repeater employing an antenna array and employing echo cancellation before the antenna weights are determined according to one embodiment of the present invention.
Figure 17:
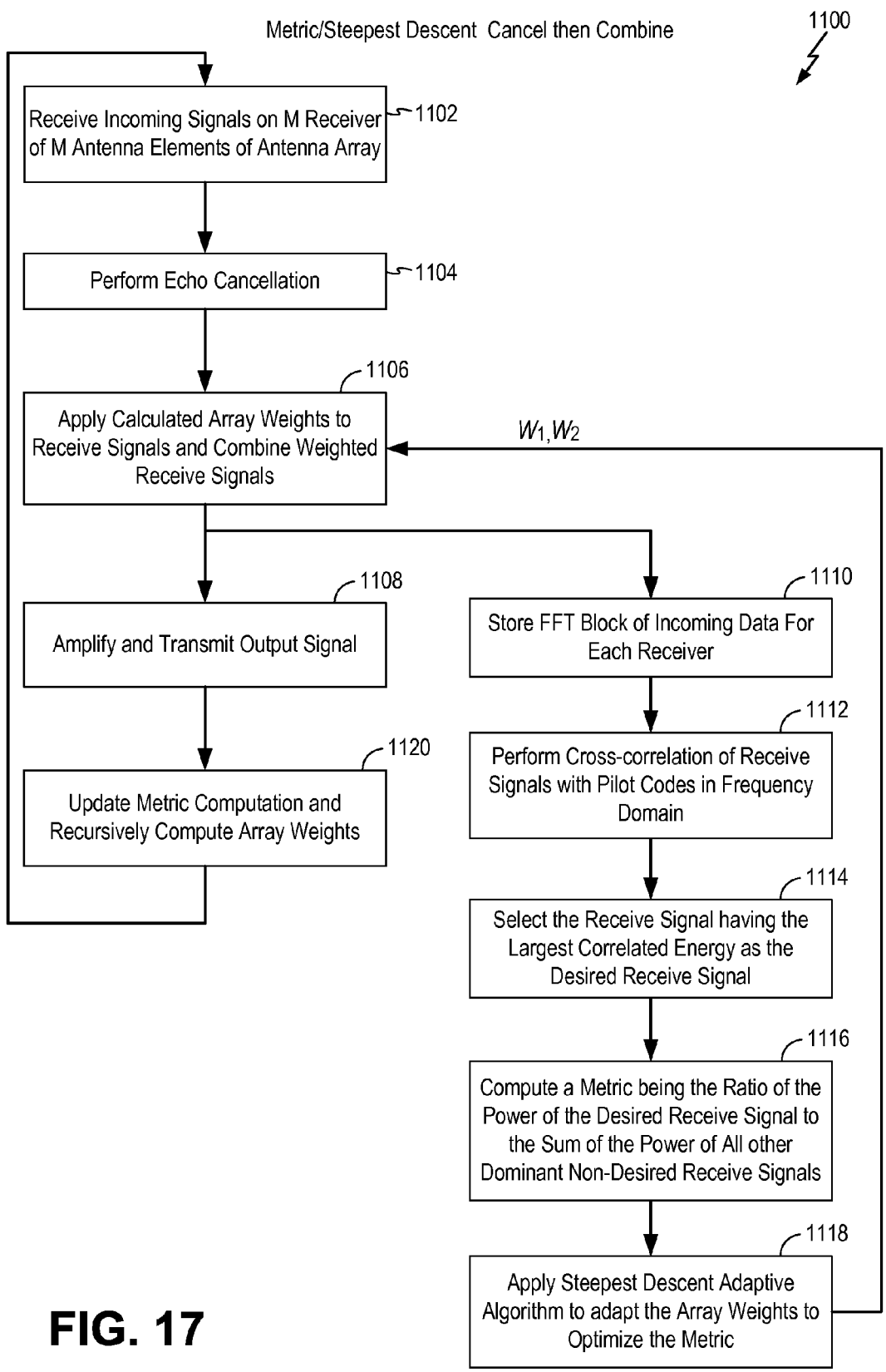
FIG. 17 is a flowchart illustrating an adaptive antenna weight computation method implemented in the repeater of FIG. 16 using a metric with a metric optimization algorithm according to one embodiment of the present invention.

FIG. 16 is a schematic diagram of a repeater employing an antenna array and employing echo cancellation before the antenna weights are determined using the antenna weight computation method according to one embodiment of the present invention. FIG. 17 is a flowchart illustrating an antenna weight computation method implemented in the repeater of FIG. 16 using a metric with a metric optimization algorithm according to one embodiment of the present invention. The antenna weight computation method of FIG. 17 is referred to as "Metric/Steepest Descent Cancel then Combine" to refer to the use of a metric with a metric optimization algorithm in a repeater that perform echo cancellation before combining the array data. The operation of the Metric/Steepest Descent Cancel then Combine adaptive antenna weight computation method 1100 as implemented in repeater 1500 will now be described with reference to both FIGS. 16 and 17.

Repeater 1500 includes an antenna array formed by a first antenna element 1502 and a second antenna element 1504. First and second receiver circuits RCVR1 and RCVR2 (1506, 1508) are coupled to the first and second antenna elements respectively. Method 1100 receives incoming signals from the operating environment on M receiver circuits (RCVR1, RCVR2) associated with M antenna elements 1502, 1504 of the antenna array (step 1102). The incoming signals can include remote signals from nearby base stations and feedback signals from the repeater's own antennas.

The incoming signals at each receiver circuit 1506, 1508 are provided to echo cancellers 1510, 1512 for echo cancellation where the feedback signal components of the incoming signals are removed or substantially removed (step 1104). The echo-cancelled receive signals are provided to multipliers 1518 and 1519 to be multiplied with the respective array weights $W_1$ and $W_2$, thereby steering the antenna reception (step 1106). The weighted echo-cancelled signals are then combined at combiner 1520. The combined signal is amplified by variable gain amplifier 1522 and provided to the transmitter circuit 1524 for transmission on an antenna element 1526 (step 1108). Array weights $W_1$ and $W_2$ are recursively calculated to optimize the metric. Therefore, at any point in the operation of repeater 1500, the most recently computed values for array weights $W_1$ and $W_2$ are used at multipliers 1518, 1519. The values for array weights $W_1$ and $W_2$ are updated at each metric optimization calculation.

Meanwhile, the combined echo-cancelled receive signal is provided to a correlation block 1514 to compute the correlation of the combined echo-cancelled signal with known pilot codes or known pilot code phases. In the present embodiment, the correlation is performed in the frequency domain and thus correlation block 1514 includes storage elements to store an FFT (Fast Fourier Transform) block of data for each receiver (step 1110). Then, method 1100 performs cross-correlation of the receive signals with known pilot codes or known pilot code phases in frequency domain (step 1112). The correlation results are then provided to metric generation and optimization block 1516 to compute the array weights $W_1$ and $W_2$ using a metric and a metric optimization algorithm as follows.

First, method 1100 selects the desired receive signal being the receive signal having the largest correlated energy (step 1114). Then, a metric is computed based on the desired receive signal (step 1116). In one embodiment, the metric is given as the ratio of the correlated power of the desired receive signal to the sum of the correlated power of all or some of the other receive signals. Then, a metric optimization algorithm, such as a steepest descent adaptive algorithm is applied to adaptively compute the array weights $W_1$ and $W_2$ for the antenna elements 1502, 1504 with the goal of optimizing the metric (step 1118). The computed array weights $W_1$ and $W_2$ are then provided to multipliers 1518 and 1519 to apply the newly calculated array weights to the incoming receive signals. Method 1100 can then be repeated for the next FFT block of data to update the metric computation (step 1120). The steepest descent algorithm is recursively apply to compute the array weights while the metric is optimized.

Antenna Array with Vertical and Horizontal Feeds

Referring again to FIG. 1, in some configurations, the patch antennas 410 and 415 can be operated in two modes. More specifically, the patch antennas 410 and 415 can each be operated in a vertical feed mode and a horizontal feed mode. Accordingly, on each side of PCB 405, there are effectively four antennas—two vertical feed antennas and two horizontal feed antennas. The antenna configuration 400 in FIG. 1 can thus operate with eight antennas, where four antennas are in the vertical feed mode and four antennas are in the horizontal feed mode.

According to one aspect of the present invention, an echo cancellation repeater employing antenna arrays includes antenna elements for vertical feed mode and antenna elements for horizontal feed modes where the antenna elements are switchably connected to select a combination of antenna elements for the receive side and the transmit side to obtain the desired performance result. In some embodiments, the repeater implements an antenna weight computation method to compute antenna weights for each combination of antenna elements. Performance results for different combinations of antenna elements are compared to select the antenna element combination providing the best desired performance result. Accordingly, a combination of antenna elements is selected to steer the reception and transmission of the antenna arrays so that the repeater with the antenna arrays can be operated to reduce interference and improve signal reception.

In some embodiments, the desired performance result is measured by one or more performance factors and multiple performance factors may be weighted to tailor the performance result for specific applications. The performance factors can include the quality of the receive signal, the quality of the channel or the amount of feedback signals. Other performance factors can also be used to define the desired performance result to be obtained.

In embodiments of the present invention, an echo cancellation repeater with switchably connected antenna elements is implemented by switchably connecting two or more antenna elements to a single transceiver circuit. Accordingly, a smaller number of transceiver circuits is required to support a large number of antenna elements. The repeater with switchably connected antenna elements provides an advantage in that the repeater can be provided with a large number of antenna elements while maintaining a small form factor and reduced weight and complexity.

According to another aspect of the present invention, an echo cancellation repeater employing antenna arrays includes antenna elements for vertical feed mode and antenna elements for horizontal feed modes where each antenna element is coupled to a transceiver circuit. The repeater applies beamforming techniques in baseband to select the desired antenna elements and to change the spatial selectivity of the antenna arrays to obtain the desired performance result. In some embodiments, antenna weights for the receiver and the transmitter are determined in baseband to combine signals from the antenna elements to achieve the desired directionality of the array. In some embodiments, the desired performance result is measured by one or more performance factors and multiple performance factors may be weighted to tailor the performance result for specific applications.

Antenna Array with Switchably Connected Antenna Elements

Figure 18:
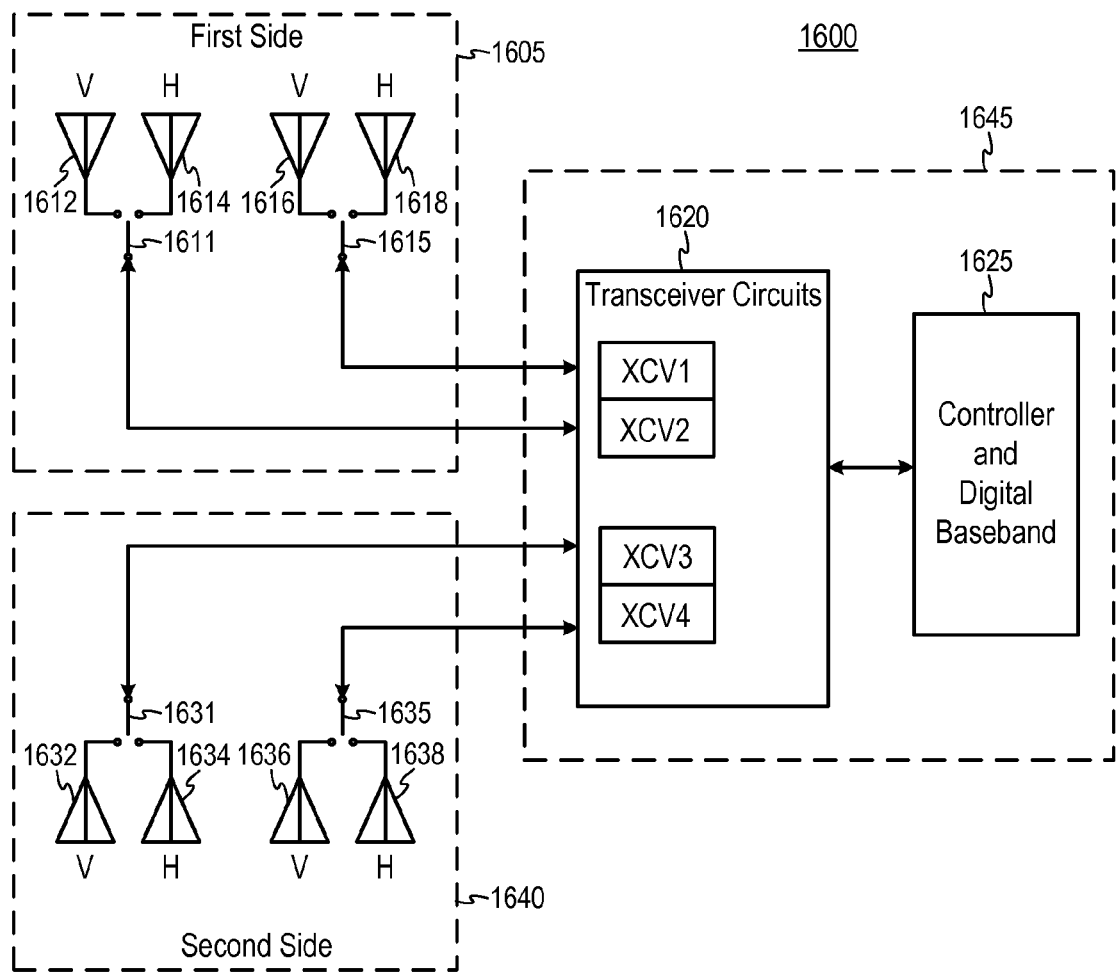
FIG. 18 illustrates an echo cancellation repeater operative to perform signal conditioning and amplification using one or more antenna arrays according to embodiments of the present invention.

FIG. 18 illustrates an echo cancellation repeater 1600 operative to perform signal conditioning and amplification using one or more antenna arrays according to embodiments of the present invention. Repeater 1600 includes a first antenna array 1605 disposed, for example, on a first side of the antenna configuration and a second antenna array 1640 disposed, for example, on a second side of the antenna configuration. The first antenna array 1605 includes antenna elements 1612, 1614 which can be formed as a patch antenna, and antenna elements 1616, 1618 which can be formed as another patch antenna. The second antenna array includes antenna elements 1632, 1634 which can be formed as a patch antenna, and antenna elements 1636 and 1638 which can be formed as another patch antenna. In each patch antenna, a first antenna element (such as element 1612 and 1616) is disposed for vertical feel mode while a second antenna element (such as element 1614 and 1618) is disposed for horizontal feed mode.

The repeater 1600 further includes a processing circuitry 1645 including multiple transceiver circuits 1620 and a controller and baseband circuit 1625. The antenna arrays 1605 and 1640 cooperate with the multiple transceiver circuits 1620 which cooperates with controller and baseband circuit 1625 as part of operations of repeater 1600. In operation, incoming signals can be received by antenna array 1605 or 1640 and passed to processing circuitry 1645 for signal conditioning and processing and then passed back to the other antenna array 1605 or 1640 for transmission as outgoing signals. For instance, the incoming signals may come from a base station of a CDMA wireless communications network and the outgoing signals may be intended for a mobile device within the repeater's range. In the present embodiment, the processing circuitry 1645 performs echo cancellation as part of the signal conditioning and processing operation. It is imperative to note that the number and configuration of the antenna arrays described herein are merely illustrative as the herein described repeater systems and methods contemplate use of varying number of antenna arrays having varying configurations and comprising varying number of antenna elements.

In the present embodiment, the antenna elements in the first and second antenna arrays 1605 and 1640 are coupled to switches to allow the antenna elements to be individually selected to steer the antenna reception. In the present embodiment, a pair of vertical feed and horizontal feed antennas is coupled to a switch so that the eight antennas are coupled to four transceiver circuits through four switches. For instance, in the first antenna array 1605, a switch 1611 is coupled to select between vertical feed antenna element 1612 and horizontal feed antenna element 1614 and another switch 1615 is coupled to select between vertical feed antenna element 1616 and horizontal feed antenna element 1618. The second antenna array 1640 is constructed in a similar manner with switches 1631 and 1635 coupled to the antenna elements to select between antenna elements 1632 and 1634 and to select between antenna elements 1636 and 1638.

In repeater 1600, the selected antenna elements are connected to transceiver circuits 1620 in the processing circuitry 1645. In the present embodiment, the repeater 1600 includes four switches coupled to select a combination four antenna elements out of the eight antenna elements. The selected antenna element for each switch is coupled to a transceiver circuit. Thus, four transceiver circuits XCV1 to XCV4 are provided to cooperate with the four switches selecting a combination of antenna elements. Each transceiver circuit includes a receiver circuit to receive the incoming receive signal from the associated antenna element and a transmitter circuit to provide the outgoing transmitted signal to the associated antenna element.

In operation, switches 1611, 1615, 1631 and 1635 are controlled by the controller and baseband circuit 1625 to select a combination of four out of eight antenna elements. The selected combination of antenna elements may include antenna elements of the same feed; that is, all vertical feed or all horizontal feed. The selected combination may also include antenna elements of either the vertical or the horizontal feed. Thus, in repeater 1600, sixteen combination of antenna elements are possible. In other embodiments, the repeater may be provided with different number of antenna elements in each antenna array and the antenna array may have different configurations, such as three antenna elements coupled to a switch. The exact number of antenna elements or configuration of the antenna elements is not critical to the practice of the present invention.

In accordance with embodiments of the present invention, repeater 1600 implements the antenna element selection method of the present invention to select a combination of antenna elements from the antenna arrays for reception and transmission so as to obtain the best desired performance result. Furthermore, repeater 1600 applies the antenna weight computation method described above to determine antenna weights for the selected combination of antenna elements to modify the spatial selectivity of the antenna array so as to steer the antenna array of the repeater to be more receptive to transmission from a desired direction, thereby reducing signal interference and improving reception quality.

In an antenna array, the signal from each antenna element can be multiplied by a different weight to achieve the desired antenna spatial selectivity. In the present description, array weights refer to the complex values (e.g. $W=a+jb$) used to multiply the receive signal of each antenna element. The weighted receive signals of all the antenna elements are combined to form the antenna beam. When the array weights are chosen properly, the antenna beam can be steered in such a way so as to cancel energy from undesirable directions and emphasis energy from desired directions. That is, the antenna beam can be steered by changing the antenna weights to change the direction of maximum reception.

Figure 19:
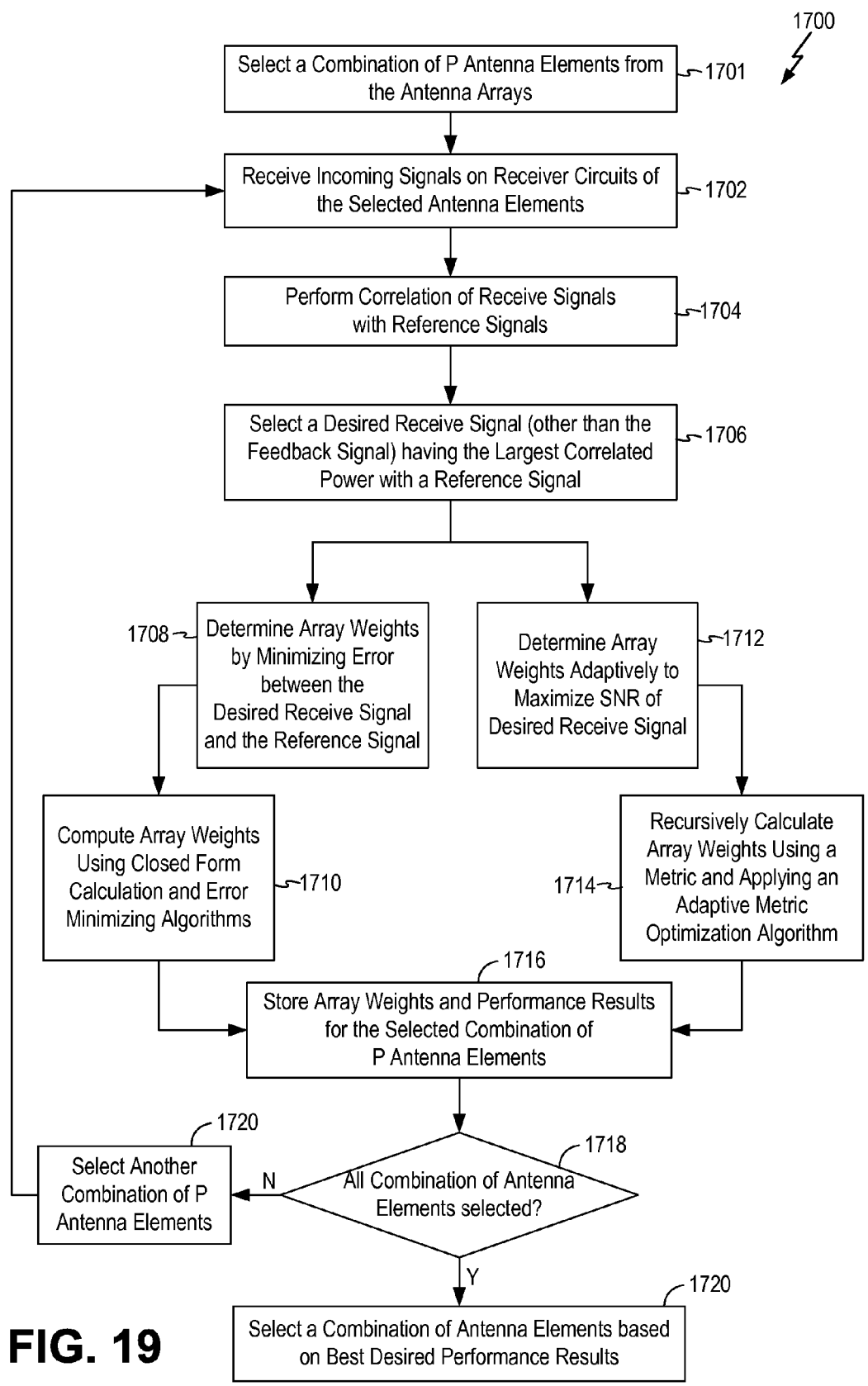
FIG. 19 is a flow chart illustrating an antenna element selection method incorporating the antenna weight computation method implemented in an echo cancellation repeater employing antenna arrays for improving signal reception according to one embodiment of the present invention.

FIG. 19 is a flow chart illustrating an antenna element selection method incorporating the antenna weight computation method implemented in an echo cancellation repeater employing antenna arrays for improving signal reception according to one embodiment of the present invention. Referring to FIG. 19, antenna element selection method 1700 is implemented in a repeater employing a first antenna array including horizontal feed and vertical feed antenna elements and a second antenna array including horizontal feed and vertical feed antenna elements. In operation, one antenna array is receiving incoming signals while the other antenna array is transmitting outgoing signals. The antenna elements of both antenna arrays are switchably connected to transceiver circuits of the repeater to process incoming and outgoing signals. The antenna element selection method enables the selection of a combination of antenna elements from the two antenna arrays to obtain the best performance results.

At step 1701, a combination of P antenna elements from the first and second antenna arrays is selected. The P antenna elements can include any number of vertical feed or horizontal feed antenna elements from the first and second antenna arrays. Then, at step 1702, the repeater receives incoming signals from the operating environment on the receiver circuits associated with selected antenna elements of the receiving antenna array. The incoming signals can include remote signals from nearby base stations and the feedback signal from the repeater's own antennas. The repeater may perform echo cancellation at this stage or the repeater may perform echo cancellation after the antenna array weights are calculated and the incoming signals from the different antenna elements are combined.

Method 1700 performs correlation of the receive signals with one or more reference signals (step 1704). When the repeater is deployed in a CDMA based communication system, the reference signals are the known pilot signals or known pilot codes or known pilot code phases of the base stations in the system. Pilot code phases refer to the same pilot code with known code offsets. When the repeater is deployed in a WCDMA based communication system, the reference signals are the known scrambling codes of the base stations in the system. Finally, when the repeater is deployed in a non-CDMA based communication system, the reference signals are some or all of the pilot tones in an OFDM symbol or an OFDM preamble. In other communication systems, the known pilot codes or pilot signals used in those systems can be used as the reference signals. Method 1700 computes the correlated power or correlated energy of the receive signals corresponding to the one or more reference signals, such as one or more pilot codes or pilot tones.

After computing the correlated power of the receive signals, method 1700 selects a desired receive signal being the receive signal, other than the feedback signal, having the largest correlated power with a reference signal, such as a known pilot code phase (step 1706). That is, the desired receive signal is selected from the receive signals excluding the leakage or feedback signals at the repeater, if any. It is instructive to note that in some embodiments, the antenna weights are determined after echo cancellation is carried out, while in other embodiments, the antenna weights are determined before echo cancellation. In the case when antenna weights are determined before echo cancellation, the largest correlated power detected by method 1700 could be the feedback signal from the repeater itself. Any leakage or feedback signals should be excluded when selecting the desired receive signal. Accordingly, in one embodiment, the desired receive signal is determined by searching for the signal with the largest correlated power a delay D prior to the signal with the overall largest correlated power level, the signal with the overall largest correlated power being the feedback signal, where delay D represents the delay through the repeater.

Once the desired receive signal is selected, method 1700 determines the weights to be used with each of the P antenna elements (the "array weights") in order to steer the antenna beam for improving spatial selectivity. The array weights, including receive antenna weights and transmit antenna weights, can be determined using various algorithms and metrics.

In some embodiments, the array weights are determined by minimizing the error between the desired receive signal and the reference signal (step 1708). More specifically, in some embodiments, the array weights are calculated in closed form using an error minimizing algorithm (step 1710). In one embodiment, closed form calculation using a minimum mean square error (MMSE) algorithm is used to determine the array weights. More specifically, the antenna weights are computed in closed form to minimize the mean square error between the desired receive signal and the reference signal (the known pilot signal or pilot code phase). The MMSE algorithm is applied to select antenna weights so that the desired receive signal looks as close as possible to the reference signal in phase and in magnitude. In other embodiments, other closed form algorithm can be used to compute the array weights.

In alternate embodiments, the array weights are determined adaptively to maximize the signal-to-noise ratio (SNR) of the desired receive signal (step 1712). In some embodiments, the array weights are computed recursively using a metric and an adaptive metric optimization algorithm (step 1714). That is, a metric is provided to estimate the SNR of the desired receive signal and the antenna weights are recursively computed to optimize the predetermined metric. In some embodiments, the metric used is the ratio of the correlated power of the desired receive signal to the sum of the correlated power of some or all of the other receive signals. In one embodiment, the metric sums only the dominant non-desired receive signals as the denominator of the ratio where the dominant non-desired receive signals refer to receive signals other than the desired receive signal having a correlated power level above a predetermined threshold. Furthermore, in one embodiment, a steepest descent algorithm is used to recursively determine the antenna weights while optimizing the metric. The use of a steepest descent algorithm is illustrative only. In other embodiments, other adaptive metric optimization algorithm can be used.

It is imperative to note that the error minimizing computation method (steps 1708-1710) and the SNR maximizing computation method (steps 1712-1714) represent alternate methods for determining the array weights of the receiving antenna array. They are both shown in the flowchart of FIG. 19 to illustrate the alternate methods but method 1700 can be implemented with one or the other array weight computation method and does not need to implement both array weight computation methods at the same time.

After the array weights for the currently selected antenna element combination are computed, method 1700 stores the array weights and also stores the performance result for the currently selected antenna element combination (step 1716). The performance result can be derived from one or more performance factors. The performance factors can include the amount of feedback signal, the quality of the channel and the signal-to-noise ratio (SNR) of the receive signals. After the array weights and the performance result for the currently selected antenna element combination are stored, method 1700 proceeds to determine if all combinations of antenna elements have been selected (step 1718). If not all combinations have been evaluated, method 1700 proceeds to select another combination of P antenna elements from the first and second antenna arrays (step 1720). Method 1700 returns to step 1702 where the incoming signals are received on the receiver circuits of the selected antenna elements.

Method 1700 continues until all combinations of antenna elements have been selected and the array weights and performance results have been stored for all antenna element combinations. Then, a desired combination of antenna elements is selected based on the best desired performance results (step 1720). Accordingly, a combination of antenna elements is selected to steer the reception and transmission of the antenna arrays so that the repeater with the antenna arrays can be operated to reduce interference and improve signal reception.

As described above, the performance result can be derived from one or more performance factors. In embodiments of the present invention, the performance factors can include the amount of feedback signal from the transmitter. Accordingly, the desired performance result can be expressed as the antenna element combination that gives the lowest feedback signal from the transmitter.

Another performance factor includes the quality of the channel and the ease of cancelling the feedback signal from the channel. The desired performance result can be an antenna element combination that gives a channel with a high degree of ease of feedback cancellation. Another performance factor includes the quality of the receive signal as measured by the signal-to-noise ratio (SNR). The desired performance result can be an antenna element combination that gives a receive signal with the best SNR or the best match to a desired reference. Other performance factors are can also be used and the performance factors described herein are illustrative only and are not intended to be limiting.

In method 1700, all combination of antenna elements from the antenna arrays are evaluated to select the desired combination of antenna elements. In other embodiments, the antenna element selection method can be implemented to evaluate only a subset of the combination of antenna elements. It is not critical to evaluate all possible combinations of antenna elements.

Array with Vertical and Horizontal Feed Antenna Elements

Figure 20:
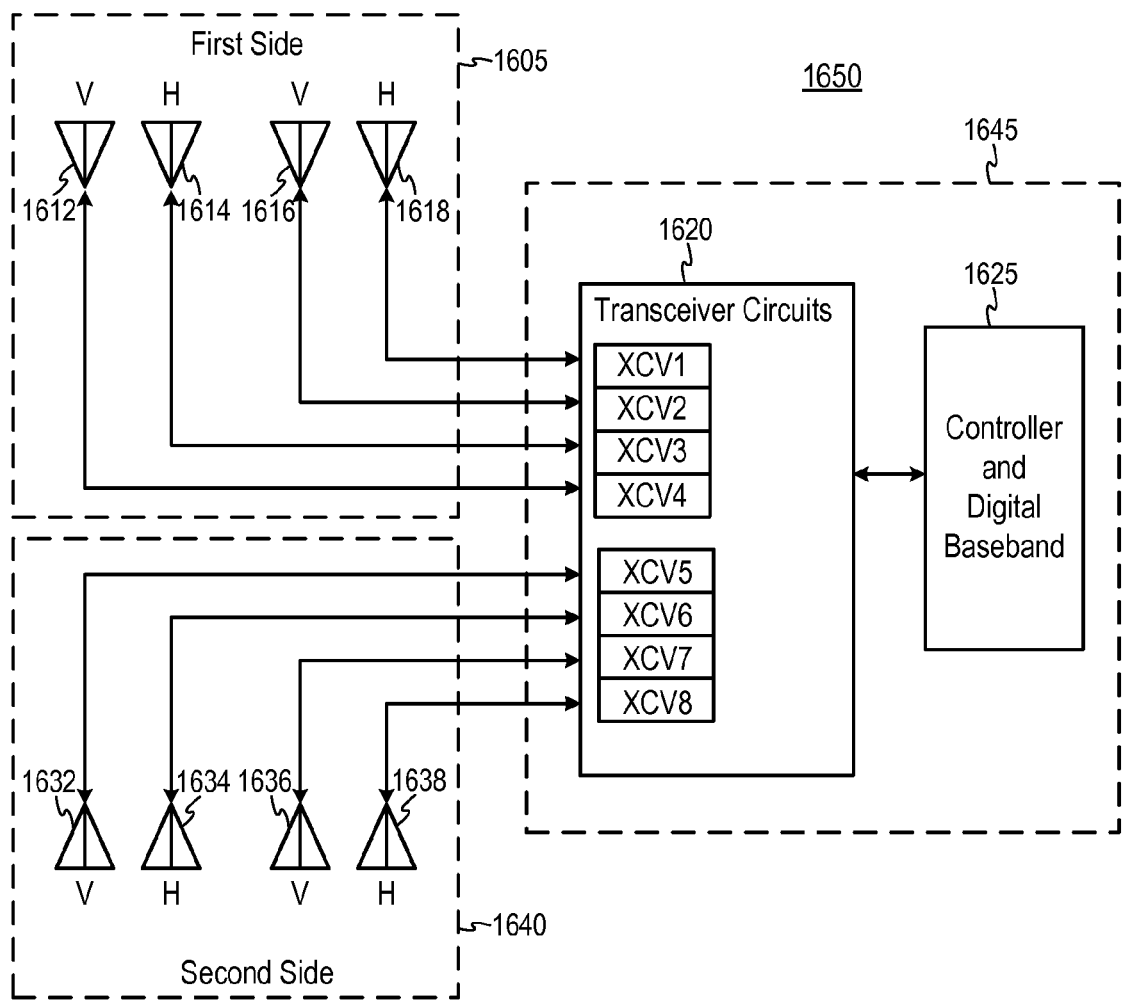
FIG. 20 illustrates an echo cancellation repeater operative to perform signal conditioning and amplification using one or more antenna arrays according to embodiments of the present invention.

FIG. 20 illustrates an echo cancellation repeater 1650 operative to perform signal conditioning and amplification using one or more antenna arrays according to embodiments of the present invention. Repeater 1650 is constructed in a similar manner as repeater 1600 of FIG. 18 and includes a first antenna array 1605 disposed on a first side of the antenna configuration and a second antenna array 1640 disposed on a second side of the antenna configuration. In operation, one antenna array is disposed for receiving incoming signals while the other antenna array is disposed for transmitting outgoing signals. Furthermore, each of the first and second antenna arrays include antenna elements for the vertical feed mode and the horizontal feed mode. However, in repeater 1650, the antenna elements are not switchably connected to the transceiver circuits. Rather, the processing circuitry 1645 includes transceiver circuits 1620 for each antenna element. More specifically, a bank of transceiver circuits XCV1 to XCV8 in the multiple transceiver circuit 1620 is provided. Each transceiver circuit is associated with a single antenna element. More specifically, each of transceiver circuits XCV1 to XCV8 is coupled to a vertical feed or horizontal feed antenna element 1612, 1614, 1616, 1618, 1632, 1634, 1636 or 1638. Repeater 1650 applies beamforming techniques in baseband to select the desired antenna elements and to change the spatial selectivity of the antenna arrays to obtain the desired performance result.

Figure 21:
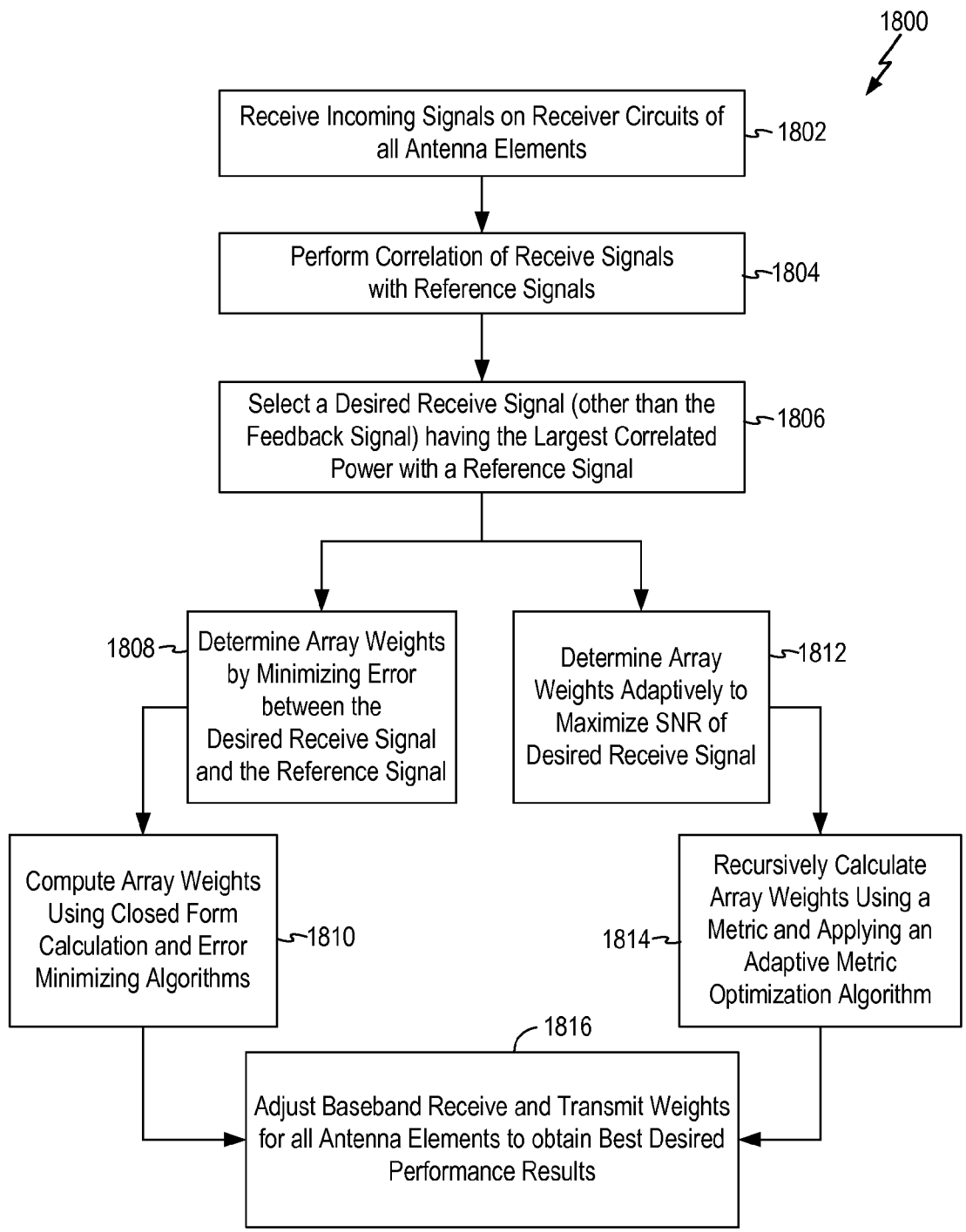
FIG. 21 is a flow chart illustrating an antenna element selection method incorporating the antenna weight computation method implemented in an echo cancellation repeater employing antenna arrays for improving signal reception according to one embodiment of the present invention.

FIG. 21 is a flow chart illustrating an antenna element selection method incorporating the antenna weight computation method implemented in an echo cancellation repeater employing antenna arrays for improving signal reception according to one embodiment of the present invention. The antenna element selection method 1800 of FIG. 21 is applied to the repeater 1650 of FIG. 20 to perform selection of the antenna elements for reducing interference and improving signal reception. Referring to FIG. 21, at step 1802, the repeater receives incoming signals from the operating environment on the receiver circuits associated with all of the antenna elements of the receiving antenna array. The incoming signals can include remote signals from nearby base stations and the feedback signal from the repeater's own antennas. The repeater may perform echo cancellation at this stage or the repeater may perform echo cancellation after the antenna array weights are calculated and the incoming signals from the different antenna elements are combined.

Method 1800 performs correlation of the receive signals with one or more reference signals (step 1804). When the repeater is deployed in a CDMA based communication system, the reference signals are the known pilot signals or known pilot codes or known pilot code phases of the base stations in the system. Pilot code phases refer to the same pilot code with known code offsets. When the repeater is deployed in a WCDMA based communication system, the reference signals are the known scrambling codes of the base stations in the system. Finally, when the repeater is deployed in a non-CDMA based communication system, the reference signals are some or all of the pilot tones in an OFDM symbol or an OFDM preamble. In other communication systems, the known pilot codes or pilot signals used in those systems can be used as the reference signals. Method 1800 computes the correlated power or correlated energy of the receive signals corresponding to the one or more reference signals, such as one or more pilot codes or pilot tones.

After computing the correlated power of the receive signals, method 1800 selects a desired receive signal being the receive signal, other than the feedback signal, having the largest correlated power with a reference signal, such as a known pilot code phase (step 1806). That is, the desired receive signal is selected from the receive signals excluding the leakage or feedback signals at the repeater, if any. It is instructive to note that in some embodiments, the antenna weights are determined after echo cancellation is carried out, while in other embodiments, the antenna weights are determined before echo cancellation. In the case when antenna weights are determined before echo cancellation, the largest correlated power detected by method 1800 could be the feedback signal from the repeater itself. Any leakage or feedback signals should be excluded when selecting the desired receive signal. Accordingly, in one embodiment, the desired receive signal is determined by searching for the signal with the largest correlated power a delay D prior to the signal with the overall largest correlated power level, the signal with the overall largest correlated power being the feedback signal, where delay D represents the delay through the repeater.

Once the desired receive signal is selected, method 1800 determines the weights to be used with each of the antenna elements (the "array weights") in order to steer the antenna beam for improving spatial selectivity. The array weights, including receive antenna weights and transmit antenna weights, can be determined using various algorithms and metrics.

In some embodiments, the array weights are determined by minimizing the error between the desired receive signal and the reference signal (step 1808). More specifically, in some embodiments, the array weights are calculated in closed form using an error minimizing algorithm (step 1810). In one embodiment, closed form calculation using a minimum mean square error (MMSE) algorithm is used to determine the array weights. More specifically, the antenna weights are computed in closed form to minimize the mean square error between the desired receive signal and the reference signal (the known pilot signal or pilot code phase). The MMSE algorithm is applied to select antenna weights so that the desired receive signal looks as close as possible to the reference signal in phase and in magnitude. In other embodiments, other closed form algorithm can be used to compute the array weights.

In alternate embodiments, the array weights are determined adaptively to maximize the signal-to-noise ratio (SNR) of the desired receive signal (step 1812). In some embodiments, the array weights are computed recursively using a metric and an adaptive metric optimization algorithm (step 1814). That is, a metric is provided to estimate the SNR of the desired receive signal and the antenna weights are recursively computed to optimize the predetermined metric. In some embodiments, the metric used is the ratio of the correlated power of the desired receive signal to the sum of the correlated power of some or all of the other receive signals. In one embodiment, the metric sums only the dominant non-desired receive signals as the denominator of the ratio where the dominant non-desired receive signals refer to receive signals other than the desired receive signal having a correlated power level above a predetermined threshold. Furthermore, in one embodiment, a steepest descent algorithm is used to recursively determine the antenna weights while optimizing the metric. The use of a steepest descent algorithm is illustrative only. In other embodiments, other adaptive metric optimization algorithm can be used.

It is imperative to note that the error minimizing computation method (steps 1808-1810) and the SNR maximizing computation method (steps 1812-1814) represent alternate methods for determining the array weights of the antenna array. They are both shown in the flowchart of FIG. 21 to illustrate the alternate methods but method 1800 can be implemented with one or the other array weight computation method and does not need to implement both array weight computation methods at the same time.

After the array weights for the currently selected antenna element combination are computed, method 1800 then performs beamforming to select a combination of antenna elements to obtain the best desired performance result (step 1816). More specifically, beamforming techniques are applied in baseband to adjust the receive and transmit weights for all of the antenna elements of the first and second antenna array so that a combination of antenna elements is selected to obtain the best desired performance result. The performance result can be derived from one or more performance factors. The performance factors can include the amount of feedback signal, the quality of the channel and the signal-to-noise ratio (SNR) of the receive signals, as described above. In this manner, the repeater 1650 is configured to operate with selected antenna elements to give the desired directional signal transmission and reception.

The communication system in which the repeater of the present invention can be deployed includes various wireless communication networks based on infrared, radio, and/or microwave technology. Such networks can include, for example, a wireless wide area network (WWAN), a wireless local area network (WLAN), a wireless personal area network (WPAN), Worldwide Interoperability for Microwave Access (Wi-max) and so on. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as CDMA2000, Wideband-CDMA (W-CDMA), and so on. CDMA2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). CDMA2000 is described in documents from a consortium named "3rd Generation Partnership Project 2" (3GPP2). 3GPP and 3GPP2 documents are publicly available. Other 3G based wireless network can also be used. A WLAN may be an IEEE 802.11x network, and a WPAN may be a Bluetooth network, an IEEE 802.15x, or some other type of network. The systems and techniques described herein may also be used for any combination of WWAN, WLAN and/or WPAN.

Those skilled in the art will understand that information and signals may be represented using any of a variety of different technologies and techniques. For example: data, information, signals, bits, symbols, chips, instructions, and commands may be referenced throughout the above description. These may be represented by voltages, currents, electromagnetic waves, magnetic fields or particles, optical fields or particles, or any combination thereof.

In one or more exemplary embodiments, the functions and processes described may be implemented in hardware, software, firmware, or any combination thereof. If implemented in software, the functions may be stored on computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. The term "control logic" used herein applies to software (in which functionality is implemented by instructions stored on a machine-readable medium to be executed using a processor), hardware (in which functionality is implemented using circuitry (such as logic gates), where the circuitry is configured to provide particular output for particular input, and firmware (in which functionality is implemented using re-programmable circuitry), and also applies to combinations of one or more of software, hardware, and firmware.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a memory, for example the memory of mobile station or a repeater, and executed by a processor, for example the microprocessor of modem. Memory may be implemented within the processor or external to the processor. As used herein the term "memory" refers to any type of long term, short term, volatile, nonvolatile, or other memory and is not to be limited to any particular type of memory or number of memories, or type of media upon which memory is stored. The term "machine readable medium" does not embrace transitory propagating signals.

Moreover, the previous description of the disclosed implementations is provided to enable any person skilled in the art to make or use the present invention. Various modifications to these implementations will be readily apparent to those skilled in the art, and the generic principles defined herein may be applied to other implementations without departing from the spirit or scope of the invention. Thus, the present invention is not intended to be limited to the features shown herein but is to be accorded the widest scope consistent with the principles and novel features disclosed herein.

What is claimed is:

1. A method to reduce interference in an echo cancellation repeater for a wireless communication network, the repeater employing a first antenna array and a second antenna array, each antenna array including a first set of antenna elements for vertical feed mode and a second set of antenna elements for horizontal feed mode, the method comprising:
   (a) selecting a combination of antenna elements from the first and second antenna arrays;
   (b) receiving incoming receive signals on receiver circuits associated with the selected antenna elements;
   (c) generating correlation energy measurements indicative of correlation of the receive signals and one or more reference signals;
   (d) selecting a desired receive signal being a receive signal with a largest correlated energy level, excluding receive signals that are feedback signals of the repeater;
   (e) calculating antenna weights for the selected antenna elements using one of an error minimizing algorithm or an adaptive metric optimization algorithm;
   (f) determining a performance result associated with the selected combination of antenna elements;
   (g) storing calculated antenna weights and the performance result associated with the selected combination of antenna elements;
   (h) repeating steps (a) to (g) for one or more combinations of antenna elements from the first and second antenna arrays; and
   (i) selecting a combination of antenna elements from the first and second antenna arrays based on the stored performance results.

2. The method of claim 1, wherein generating correlation energy measurements indicative of the correlation of the receive signals and one or more reference signals comprises:
   generating correlation energy measurements indicative of correlation of the receive signals and one or more pilot code phases of a CDMA-based communication system.

3. The method of claim 1, wherein generating correlation energy measurements indicative of the correlation of the receive signals and one or more reference signals comprises:
   generating correlation energy measurements indicative of correlation of the receive signals and one or more scrambling codes of a WCDMA-based communication system.

4. The method of claim 1, wherein generating correlation energy measurements indicative of the correlation of the receive signals and one or more reference signals comprises:
   generating correlation energy measurements indicative of correlation of the receive signals and one or more pilot tones of an OFDM symbol or an OFDM preamble.

5. The method of claim 1, wherein the receive signals include the feedback signals of the repeater and selecting a desired receive signal being a receive signal with the largest correlated energy level comprises:
   selecting a desired receive signal being a receive signal with the largest correlated energy level a given delay prior to the receive signal with the overall largest correlated power level, the receive signal with the overall largest correlated power being a feedback signal and the given delay being a delay through the repeater.

6. The method of claim 1, wherein calculating antenna weights for the selected antenna elements using one of an error minimizing algorithm and an adaptive metric optimization algorithm comprises:
   calculating antenna weights in closed form using an error minimizing algorithm to minimize an error between the desired receive signal and the reference signal.

7. The method of claim 6, wherein calculating antenna weights in closed form using an error minimizing algorithm comprises:
   calculating antenna weights in closed form using a minimum mean square error (MMSE) algorithm to minimize a mean square error between the desired receive signal and the reference signal.

8. The method of claim 1, wherein calculating antenna weights for the selected antenna elements using one of an error minimizing algorithm and an adaptive metric optimization algorithm comprises:
   calculating antenna weights adaptively for the antenna elements to maximize a signal-to-noise ratio (SNR) of the desired receive signal.

9. The method of claim 8, wherein calculating antenna weights adaptively for the antenna elements to maximize a signal-to-noise ratio (SNR) of the desired receive signal comprises:
   calculating antenna weights recursively using a metric and an adaptive metric optimization algorithm to optimize the metric, the metric being indicative of the SNR of the desired receive signal.

10. The method of claim 9, wherein calculating antenna weights recursively using a metric and an adaptive metric optimization algorithm comprises:
    calculating a metric being a ratio of the correlated power measurement of the desired receive signal to the sum of the correlated power measurements of some or all of the other receive signals.

11. The method of claim 10, wherein calculating a metric being a ratio of the correlated power measurement of the desired receive signal to the sum of the correlated power measurements of some or all of the other receive signals comprises:
    calculating a metric being a ratio of the correlated power measurement of the desired receive signal to the sum of the correlated power measurements of dominant non-desired receive signals, the dominant non-desired receive signals being the receive signals other than the desired receive signal having a correlated power level above a predetermined threshold.

12. The method of claim 9, wherein calculating antenna weights recursively using a metric and an adaptive metric optimization algorithm comprises:
    applying a steepest descent adaptive algorithm to modify the antenna weights of the antenna elements to optimize the metric.

13. The method of claim 1, wherein after receiving incoming receive signals on receiver circuits associated with the selected antenna elements and before generating correlation energy measurements, the method further comprises cancelling estimated feedback signals from the receive signals.

14. The method of claim 13, further comprising:
    applying the calculated antenna weights to the receive signals;
    combining the weighted receive signals; and
    amplifying and transmitting the combined signals as output signals on one of the first and second antenna arrays.

15. The method of claim 1, further comprising:
    applying the calculated antenna weights to the receive signals;
    combining the weighted receive signals;
    cancelling estimated feedback signals from the combined signals; and
    amplifying and transmitting the echo cancelled signals as output signals on the antenna array of the repeater.

16. The method of claim 1, wherein selecting a combination of antenna elements from the first and second antenna arrays comprises:
selecting at least one antenna element of the vertical feed mode and one antenna element of the horizontal feed mode.

17. The method of claim 1, wherein determining a performance result associated with the selected combination of antenna elements comprises:
determining the performance result based on one or more performance factors, the one or more performance factors including one of an amount of feedback signal, a quality of a channel and a signal-to-noise ratio (SNR) of the receive signal.

18. The method of claim 17, wherein selecting a combination of antenna elements from the first and second antenna arrays based on the stored performance results to optimize a desired performance result comprises:
selecting a combination of antenna elements from the first and second antenna arrays to optimize the desired performance result based on a combination of antenna elements having the lowest feedback signal, or a combination of antenna elements providing a channel with a high degree of ease of feedback cancellation, or a combination of antenna elements providing a highest signal-to-noise ratio (SNR) of the receive signal.

19. The method of claim 17, wherein determining the performance result based on one or more performance factors comprises determining the performance result based on a weighted sum of one or more performance factors.

20. A repeater for a wireless communication network, the repeater comprising:
the repeater employing echo cancellation and employing a first antenna array and a second antenna array, each antenna array including a first set of antenna elements for vertical feed mode and a second set of antenna elements for horizontal feed mode, the repeater comprising:
one or more switches, each switch being coupled to two or more antenna elements in each of the first and second antenna arrays, the one or more switches being configured to select one of the two or more antenna elements coupled thereto;
receiver circuits coupled to the one or more switches to receive incoming receive signals associated with the selected antenna elements;
an antenna element selection module and an antenna weight computation module configured to select one or more combinations of antenna elements, to perform calculations of antenna weights for each selected combination of antenna elements, to determine a performance result associated with each selected combination of antenna elements, and to select a combination of antenna elements from the first and second antenna arrays based on the performance results;
and an antenna weight application module configured to apply the calculated antenna weight to condition the receive signals.

21. The repeater of claim 20, wherein the antenna weight computation module is further configured to generate for each of the selected antenna elements correlation energy measurements indicative of correlation of the receive signals and one or more reference signals, and to select a desired receive signal being a receive signal with the largest correlated energy level, excluding receive signals that are feedback signals of the repeater, and to calculate antenna weights for the antenna elements using one of an error minimizing algorithm and an adaptive metric optimization algorithm.

22. The repeater of claim 21, wherein the one or more reference signals comprise one or more pilot code phases of a CDMA-based communication system.

23. The repeater of claim 21, wherein the one or more reference signals comprise one or more scrambling codes of a WCDMA-based communication system.

24. The repeater of claim 21, wherein the one or more reference signals comprise one or more pilot tones of an OFDM symbol or an OFDM preamble.

25. The repeater of claim 21, wherein the receive signals include the feedback signals of the repeater and the antenna weight computation module is configured to select a desired receive signal being a receive signal with the largest correlated energy level a given delay prior to the receive signal with the overall largest correlated power level, the receive signal with the overall largest correlated power being a feedback signal and the given delay being a delay through the repeater.

26. The repeater of claim 21, wherein the antenna weight computation module is configured to calculate antenna weights in closed form using error minimizing algorithm to minimize an error between the desired receive signal and the reference signal.

27. The repeater of claim 21, wherein the antenna weight computation module is configured to calculate antenna weights in closed form using a minimum mean square error (MMSE) algorithm to minimize a mean square error between the desired receive signal and the reference signal.

28. The repeater of claim 21, wherein the antenna weight computation module is configured to calculate antenna weights adaptively for the selected antenna elements to maximize a signal-to-noise ratio (SNR) of the desired receive signal.

29. The repeater of claim 28, wherein the antenna weight computation module is configured to calculate antenna weights recursively using a metric and an adaptive metric optimization algorithm to optimize the metric, the metric being indicative of the SNR of the desired receive signal.

30. The repeater of claim 29, wherein the metric comprises a ratio of the correlated power measurement of the desired receive signal to the sum of the correlated power measurements of some or all of the other receive signals.

31. The repeater of claim 30, wherein the metric comprises a ratio of the correlated power measurement of the desired receive signal to the sum of the correlated power measurements of dominant non-desired receive signals, the dominant non-desired receive signals being the receive signals other than the desired receive signal having a correlated power level above a predetermined threshold.

32. The repeater of claim 29, wherein the adaptive metric optimization algorithm comprises a steepest descent adaptive algorithm applied to modify the antenna weights of M antenna elements to optimize the metric.

33. The repeater of claim 20, further comprising an echo canceller configured to cancel estimated feedback signals from the receive signals.

34. The repeater of claim 33, wherein the antenna weight computation module is further configured to combine the weighted receive signals and amplify and transmit the combined signals as output signals on the antenna array of the repeater.

35. The repeater of claim 20, wherein the antenna weight computation module is further configured to combine the weighted receive signals, cancel estimated feedback signals from the combined signals, and amplify and transmit the echo cancelled signals as output signals on the antenna array of the repeater.

36. The repeater of claim 20, wherein the antenna element selection module is configured to select at least one antenna element of the vertical feed mode and one antenna element of the horizontal feed mode for each combination of antenna elements.

37. The repeater of claim 20, wherein the antenna element selection module is configured to determine a performance result associated with each selected combination of antenna elements based on one or more performance factors, the one or more performance factors including one of an amount of feedback signal, a channel quality and a signal-to-noise ratio (SNR) of the receive signal.

38. The repeater of claim 37, wherein the antenna element selection module is configured to select a combination of antenna elements from the first and second antenna arrays to optimize a desired performance result based on a combination of antenna elements having a lowest feedback signal, or a combination of antenna elements providing a channel with a high degree of ease of feedback cancellation, or a combination of antenna elements providing a highest signal-to-noise ratio (SNR) of the receive signal.

39. The repeater of claim 37, wherein the antenna element selection module is configured to determine a performance result associated with each selected combination of antenna elements based on a weighted sum of one or more performance factors.

40. A non-transitory computer readable medium having stored thereon computer executable instructions for performing at least the following acts:
   (a) selecting a combination of antenna elements from first and second antenna arrays of an echo cancellation repeater, each antenna array including a first set of antenna elements for vertical feed mode and a second set of antenna elements for horizontal feed mode;
   (b) receiving incoming receive signals on receiver circuits associated with the selected antenna elements;
   (c) generating correlation energy measurements indicative of correlation of the receive signals and one or more reference signals;
   (d) selecting a desired receive signal being a receive signal with a largest correlated energy level, excluding receive signals that are feedback signals;
   (e) calculating antenna weights for the selected antenna elements using one of an error minimizing algorithm or an adaptive metric optimization algorithm;
   (f) determining a performance result associated with the selected combination of antenna elements;
   (g) storing calculated antenna weights and the performance result associated with the selected combination of antenna elements;
   (h) repeating steps (a) to (g) for one or more combinations of antenna elements from the first and second antenna arrays; and
   (i) selecting a combination of antenna elements from the first and second antenna arrays based on the stored performance results.

41. A repeater for a wireless communication network, the repeater comprising:
   means for employing echo cancellation and employing a first antenna array and a second antenna array, each antenna array including a first set of antenna elements for vertical feed mode and a second set of antenna elements for horizontal feed mode, the repeater comprising:
   means coupled to each set of two or more antenna elements in each of the first and second antenna arrays, the means for selecting one of the two or more antenna elements coupled thereto;
   means for receiving incoming receive signals associated with the selected antenna elements;
   means for selecting one or more combinations of antenna elements, performing calculations of antenna weights for each selected combination of antenna elements, determining a performance result associated with each selected combination of antenna elements, and selecting a combination of antenna elements from the first and second antenna arrays based on the performance results;
   and means for applying the calculated antenna weight to condition the receive signals.

42. A method to reduce interference in an echo cancellation repeater for a wireless communication network, the repeater employing a first antenna array and a second antenna array, each antenna array including a first set of antenna elements for vertical feed mode and a second set of antenna elements for horizontal feed mode, the method comprising:
   (a) receiving incoming receive signals on receiver circuits associated with the antenna elements;
   (b) generating correlation energy measurements indicative of correlation of the receive signals and one or more reference signals;
   (c) selecting a desired receive signal being a receive signal with the largest correlated energy level, excluding receive signals that are feedback signals of the repeater;
   (d) calculating antenna weights for the antenna elements using one of an error minimizing algorithm or an adaptive metric optimization algorithm;
   (e) determining a performance result associated with the antenna elements;
   (f) performing beamforming in baseband to adjust the calculated antenna weights, the adjusted antenna weights selecting a combination of antenna elements from the first and second antenna arrays for receiving and transmitting signals; and
   (g) performing echo cancellation on the receive signal or on a weighted combined receive signal using the calculated antenna weights.

43. The method of claim 42, wherein determining a performance result associated with the antenna elements comprises:
   determining the performance result based on one or more performance factors, the one or more performance factors including one of an amount of feedback signal, a channel quality and a signal-to-noise ratio (SNR) of the receive signal.

44. The method of claim 43, wherein performing beamforming in baseband to adjust the calculated antenna weights to optimize a desired performance result comprises:
   performing beamforming in baseband to adjust the calculated antenna weights to optimize a desired performance result based on a combination of antenna elements having the lowest feedback signal, or a combination of antenna elements providing a channel with a high degree of ease of feedback cancellation, or a combination of antenna elements providing a highest signal-to-noise ratio (SNR) of the receive signal.

45. The method of claim 43, wherein determining the performance result based on one or more performance factors comprises determining the performance result based on a weighted sum of one or more performance factors.

* * * * *